(12) United States Patent
Ootomo et al.

(10) Patent No.: US 11,372,786 B2
(45) Date of Patent: Jun. 28, 2022

(54) TRANSCEIVER, BRIDGE CHIP, SEMICONDUCTOR STORAGE DEVICE, AND METHOD

(71) Applicant: Kioxia Corporation, Tokyo (JP)

(72) Inventors: Goichi Ootomo, Kawasaki (JP); Shigehiro Tsuchiya, Musashimurayama (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 17/117,522

(22) Filed: Dec. 10, 2020

(65) Prior Publication Data

US 2022/0083482 A1 Mar. 17, 2022

(30) Foreign Application Priority Data

Sep. 16, 2020 (JP) .............................. JP2020-155672

(51) Int. Cl.
*G06F 13/16* (2006.01)
*G06F 1/04* (2006.01)
*G06F 13/40* (2006.01)

(52) U.S. Cl.
CPC ............ *G06F 13/1689* (2013.01); *G06F 1/04* (2013.01); *G06F 13/4027* (2013.01)

(58) Field of Classification Search
CPC ..... G06F 13/1689; G06F 13/4027; G06F 1/04
See application file for complete search history.

(56) References Cited

U.S. PATENT DOCUMENTS

| 8,504,789 B2 | 8/2013 | Pyeon et al. |
| 9,406,346 B2 | 8/2016 | D'Abreu et al. |
| 10,147,466 B1 * | 12/2018 | Taylor ...................... G11C 7/02 |
| 2006/0203602 A1 * | 9/2006 | Best ..................... G06F 13/4059 365/193 |
| 2009/0049324 A1 * | 2/2009 | Best .................... G06F 13/1668 713/400 |
| 2009/0240968 A1 * | 9/2009 | Kizer .................. G11C 11/4096 713/401 |
| 2010/0166127 A1 * | 7/2010 | Jang ...................... H04L 7/0008 375/354 |
| 2013/0019052 A1 | 1/2013 | Somanache et al. |
| 2014/0029331 A1 * | 1/2014 | Gopalakrishnan .......................... G11C 11/4063 365/149 |
| 2018/0053544 A1 * | 2/2018 | Ware .................... G11C 11/4093 |
| 2018/0144786 A1 * | 5/2018 | Lim ...................... G11C 29/023 |
| 2018/0174363 A1 * | 6/2018 | VanBlon ................. G06F 3/011 |
| 2019/0287587 A1 * | 9/2019 | Kim ...................... G11C 7/1084 |
| 2020/0027495 A1 * | 1/2020 | Takahashi ........... G11C 11/4076 |

FOREIGN PATENT DOCUMENTS

| JP | 2013-025794 A | 2/2013 |
| JP | 2014-523062 A | 9/2014 |
| JP | 5709855 B2 | 4/2015 |

* cited by examiner

*Primary Examiner* — Glenn A. Auve

(74) *Attorney, Agent, or Firm* — Oblon, McClelland, Maier & Neustadt, L.L.P.

(57) ABSTRACT

According to one embodiment, a transceiver includes a sampler, a pipeline, and a transmission circuit. The sampler takes a data signal received from a host at a timing based on a data strobe signal received from the host. The pipeline transfers the data signal taken by the sampler using at least a clock signal, different from the data strobe signal, as a drive signal. The transmission circuit acquires and transmits a data signal having passed through the pipeline.

20 Claims, 12 Drawing Sheets

TRANSCEIVER, BRIDGE CHIP, SEMICONDUCTOR STORAGE DEVICE, AND METHOD

CROSS-REFERENCE TO RELATED APPLICATIONS

This application is based upon and claims the benefit of priority from Japanese Patent Application No. 2020-155672, filed on Sep. 16, 2020; the entire contents of which are incorporated herein by reference.

FIELD

Embodiments described herein relate generally to a transceiver, a bridge chip, a semiconductor storage device, and a method.

BACKGROUND

There is a semiconductor storage device in which a bridge chip is arranged between an external terminal group connected to a host and a plurality of memory chips. In this semiconductor storage device, the plurality of memory chips are accessed by the host via the bridge chip. Inside the bridge chip, data received by a transceiver from the host can be transmitted to the memory chip side according to a data strobe signal. In order to improve the speed of data transfer between the host and the plurality of memory chips, there is a demand for the transceiver to be capable of high-speed data transfer.

DETAILED DESCRIPTION

Figure 1:
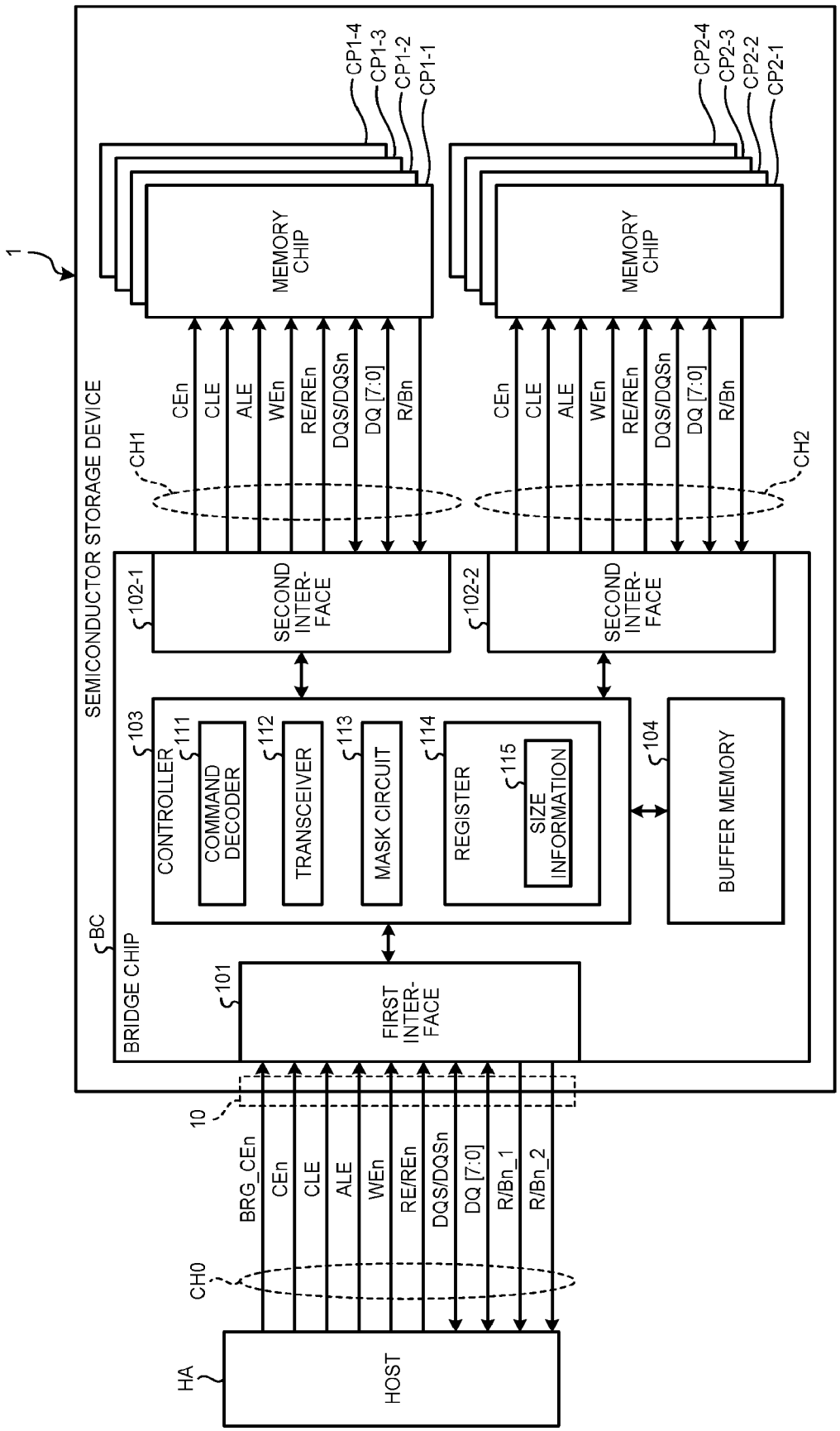
FIG. 1 is a schematic diagram illustrating an example of a configuration of a storage system to which a semiconductor storage device according to a first embodiment is applied.

According to the present embodiment, according to one embodiment, a transceiver includes a sampler, a pipeline, and a transmission circuit. The sampler takes a data signal received from a host at a timing based on a data strobe signal received from the host. The pipeline transfers the data signal taken by the sampler using at least a clock signal, different from the data strobe signal, as a drive signal. The transmission circuit acquires and transmits a data signal having passed through the pipeline.

Hereinafter, the transceiver, a bridge chip, a semiconductor storage device, and a method according to embodiments will be explained in detail with reference to the accompanying drawings. Note that the present invention is not limited to these embodiments.

First Embodiment

A semiconductor storage device according to an embodiment includes a bridge chip and a memory chip. The memory chip is connected to a host via the bridge chip. The memory chip is, for example, a memory chip of a nonvolatile memory such as a NAND flash memory.

In semiconductor storage devices, the number of memory chips mounted has increased to improve the mounting density. For example, the mounting density is improved by stacking a plurality of memory chips. A configuration in which a bridge chip called a frequency boosting interface (FBI) chip is inserted between the host and the plurality of memory chips to connect the bridge chip by a plurality of channels may be applied in order to reduce a load on the connection with each of the memory chips and increase the speed. The plurality of memory chips may be connected to the respective channels.

The bridge chip is provided with a first interface, which is a PHY circuit that transmits and receives an electrical signal corresponding to data to and or the like from the host, and a second interface which is a PHY circuit that transmits and receives an electrical signal corresponding to data or the like to and from the memory chip. The first interface and the second interface are connected by a data path. The data path can transmit the data received on the first interface to the second interface.

In the embodiment, the data path has a pipeline configuration in order to transmit and receive data at high speed. That is, the data path forms a pipeline which is a path divided into a plurality of sections by a plurality of flip-flops. Each of the plurality of sections is also called a stage. According to the pipeline configuration, a data transfer distance per clock is shortened as compared with a case where the data path does not have the pipeline configuration. As a result, a frequency of data transfer can be increased, and the speed of data transfer can be improved.

For example, as in a toggle double-data-rate (DDR) standard, a data strobe signal is sometimes used during data communication between two devices. The data strobe signal is a signal transferred together with data transferred as a data signal having a predetermined bit width (for example, 8 bits), and is a signal that instructs a counterpart device to take in the data signal. The number of times the data strobe signal is toggled corresponds to a data transfer length (in other words, the transfer size).

It is conceivable to use this data strobe signal as a drive signal for the pipeline. The drive signal is a signal supplied to clock input terminals of the plurality of flip-flops constituting the pipeline. However, data can be transferred only a distance of one stage in one clock in the pipeline. Therefore, some data remains in the pipeline only by the data strobe signals of the number of toggles corresponding to the data transfer size so that it is difficult to transmit the entire data without leaving any residue.

In the first embodiment, the bridge chip includes an oscillator circuit. Further, in order to transmit the received data without leaving any residue, the bridge chip is configured to compensate for the shortage of the number of toggles using the data strobe signal by a clock signal from the oscillator circuit.

The transceiver, the bridge chip, and the semiconductor storage device according to the first embodiment will be described hereinafter.

FIG. 1 is a schematic diagram illustrating an example of a configuration of a storage system SYS to which a semiconductor storage device 1 according to the first embodiment is applied.

The storage system SYS includes a host HA and the semiconductor storage device 1. The semiconductor storage device 1 includes an external terminal group 10, a bridge chip BC, and a plurality of memory chips CP1-1 to CP1-4 and CP2-1 to CP2-4. The semiconductor storage device 1 may be mounted as a multi-chip package (MCP) in which the memory chips CP1-1 to CP1-4 and the memory chips CP2-1 to CP2-4 are stacked. When the semiconductor storage device 1 is mounted as the MCP, the periphery of the bridge chip BC and the plurality of memory chips CP1-1 to CP1-4 and CP2-1 to CP2-4 may be sealed with a mold resin in the semiconductor storage device 1. FIG. 1 illustrates a configuration in which the four memory chips CP1-1 to CP1-4 are connected to the bridge chip BC via a channel CH1 and the four memory chips CP2-1 to CP2-4 are connected to the bridge chip BC via a channel CH2. That is, the semiconductor storage device 1 may be configured as a multi-memory chip module including the plurality of (here, eight) memory chips CP1-1 to CP1-4 and CP2-1 to CP2-4. Each of the memory chips CP1-1 to CP1-4 and CP2-1 to CP2-4 is, for example, a memory chip of a non-volatile memory such as a NAND flash memory. Note that the number of the memory chips CP provided in the semiconductor storage device 1 is not limited to eight. In addition, the number of channels connecting the bridge chip BC and the plurality of memory chips CP is not limited to two.

The host HA may be a device such as a controller, and may be a processor that controls the semiconductor storage device 1. The processor may be provided in an electronic device such as a computer or a mobile terminal. The semiconductor storage device 1 can be connected to the host HA via a wired communication path (for example, a serial bus) CH0. The semiconductor storage device 1 and the host HA are connected via the wired communication path CH0 configured based on a predetermined standard. When each of the memory chips CP1-1 to CP1-4 and CP2-1 to CP2-4 is a NAND flash memory, the predetermined standard is, for example, a toggle DDR standard. For example, the wired communication path CH0 functions as a toggle DDR interface.

The bridge chip BC is electrically connected to an external terminal group 10 that can be electrically connected to the host HA. The host HA and the external terminal group 10 are connected by a channel CH0. In addition, the bridge chip BC is electrically connected to a plurality of (here, two) channels CH1 and CH2. The plurality of memory chips CP1-1 to CP1-4 and CP2-1 to CP2-4 are connected to the bridge chip BC via the plurality of channels CH1 and CH2. The memory chips CP1-1 to CP1-4 are connected to the channel CH1 configured based on a predetermined standard. The memory chips CP2-1 to CP2-4 are connected to the channel CH2 configured based on a predetermined standard. When each of the memory chips CP is a NAND flash memory, the predetermined standard is, for example, a toggle DDR standard. Hereinafter, it is assumed that each of the memory chips CP is the NAND flash memory, and the predetermined standard is the toggle DDR standard.

The channel CH0 includes a signal line that transfers a bridge chip enable signal RG_CEn, a signal line that transfers a chip enable signal CEn, a signal line that transfers a command latch signal CLE, a signal line that transfers an address latch signal ALE, a signal line that transfers a write enable signal WEn, signal lines that transfer read enable signals RE/REn, signal lines that transfer data strobe signals DQS/DQSn, signal lines that transfer data signal DQ[7:0] having a predetermined bit width (here, as an example, a width of eight bits), and a signal line that transfers a ready/busy signal R/Bn. Note that "n" written at the end of a reference sign representing a signal indicates that the signal is operated with negative logic. Whether each signal is operated with negative logic or positive logic can be arbitrarily designed.

The chip enable signal CEn is a signal to set an enable state of the memory chip CP to be accessed. The data strobe signals DQS/DQSn is signals that instructs the counterpart device to take data transmitted by the data signal DQ[7:0]. The data strobe signals DQS/DQSn is a differential signal formed of a data strobe signal DQS and a data strobe signal DQSn. The command latch enable signal CLE is a signal indicating that the data signal DQ[7:0] is a command. The address latch enable signal ALE is a signal indicating that the data signal DQ[7:0] is an address. The write enable signal WEn is a signal that instructs the counterpart device to take the command or address transmitted by the data signal DQ[7:0]. The read enable signals RE/REn is a signal that instructs the counterpart device to output the data signal DQ[7:0]. The read enable signals RE/REn is a differential signal formed of a read enable signal RE and a read enable signal REn. The ready/busy signal R/Bn is a signal indicating a ready state (Ry) which is a state of waiting for reception of a command or a busy state (By) which is a state where it is difficult to execute a command even if receiving the command. Here, as an example, the channel CH0 includes a signal line that transfers a ready/busy signal R/Bn_1 which is a ready/busy signal R/Bn over the channel CH1 and a signal line that transfers a ready/busy signal R/Bn_2 which is a ready/busy signal R/Bn over the channel CH2. Note that the configuration of the signal line that transfers the ready/busy signal R/Bn included in the channel CH0 is not limited to the above example. For example, regarding the ready/busy signal R/Bn, the channel CH0 may include one signal line for transferring one ready/busy signal R/Bn generated by wire connection or the like between the ready/busy signal R/Bn over the channel CH1 and the ready/busy signal R/Bn over the channel CH1.

The bridge chip enable signal RG_CEn is a signal that is activated when a command for controlling the bridge chip BC is transmitted. During a period when the bridge chip enable signal RG_CEn is in an active state, the bridge chip BC interprets a signal (that is, a command, an address, or data) received during the period as a signal addressed to itself. Furthermore, the signal received from the host HA is not transferred to any memory chip CP during the period when the bridge chip enable signal RG_CEn is in the active state. The signal received from the host HA is transferred to the memory chip CP to be accessed during the period when the bridge chip enable signal RG_CEn is in an inactive state.

Hereinafter, an operation mode in which the transfer of the signal received from the host HA to the memory chip CP is cut off and the bridge chip BC interprets the signal received from the host HA as a signal for the bridge chip BC is referred to as a bridge control mode. The operation mode in which the signal received from the host HA is transferred to the memory chip CP is referred to as a non-bridge control mode.

Each of the channels CH1 and CH2 can transmit and receive the same type of signal group as a signal group except for the bridge chip enable signal RG_CEn among signal groups transmitted and received between the host HA and the bridge chip BC. That is, each of the channels CH1 and CH2 includes a signal line that transfers the chip enable signal CEn, a signal line that transfers the command latch signal CLE, a signal line that transfers the address latch signal ALE, a signal line that transfers the write enable signal WEn, signal lines that transfers the read enable signals RE/REn, signal lines that transfer the data strobe signals DQS/DQSn, a signal line group that transfers the data signal DQ[7:0], and a signal line that transfers the ready/busy signal R/Bn.

Hereinafter, the description of the data strobe signal DQSn will be omitted regarding the data strobe signals DQS/DQSn, and only the data strobe signal DQS will be described in order to simplify the description. In addition, the description of the read enable signal REn will be omitted, and only the read enable signal RE will be described regarding the read enable signals RE/REn.

The bridge chip BC includes a first interface 101, two second interfaces 102, a controller 103, and a buffer memory 104.

The first interface 101 is a PHY circuit that transmits and receives an electrical signal to and from the host HA via the channel CH0.

A second interface 102-1 among the two second interfaces 102 is a PHY circuit that transmits and receives an electrical signal to and from the four memory chips CP1-1 to CP1-4 via the channel CH1. A second interface 102-2 among the two second interfaces 102 is a PHY circuit that transmits and receives an electrical signal to and from the four memory chips CP2-1 to CP2-4 via the channel CH2.

The buffer memory 104 is a memory in which transfer data between the host HA and the memory chip CP is temporarily stored (buffered). The buffer memory 104 may be configured using, for example, a dynamic random access memory (DRAM) or configured using a static random access memory (SRAM). Note that the type of the memory forming the buffer memory 104 is not limited to these.

The controller 103 is arranged between the first interface 101 and the two second interfaces 102. The controller 103 uses the buffer memory 104 to control transmission and reception of information between the first interface 101 and the two second interfaces 102.

The controller 103 includes a command decoder 111, a transceiver 112, a mask circuit 113, and a register 114.

The command decoder 111 analyzes a command received from the host HA via the channel CH0. The command decoder 111 can issue a command to the memory chip CP according to the analysis result.

Figure 2:
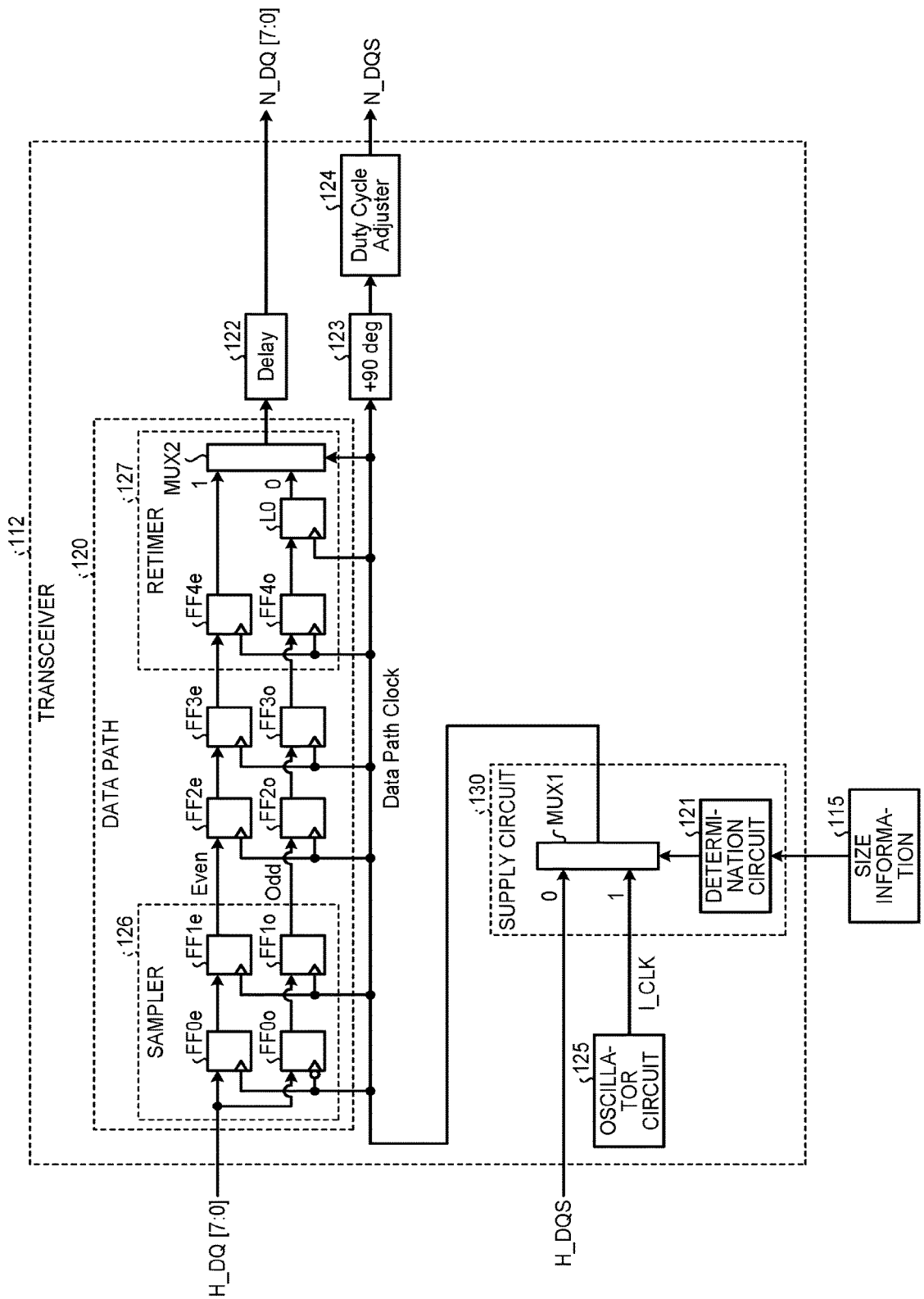
FIG. 2 is a schematic diagram illustrating a detailed configuration of a transceiver according to the first embodiment.

The transceiver 112 includes a data path having a pipeline configuration (data path 120 in FIG. 2). The data path 120 is a data path of write data received from the host HA. The data path 120 transmits the data signal DQ[7:0] and the data strobe signal DQS of the write data received from the channel CH0 via the first interface 101 to the second interfaces 102-1 and 102-2. The data signal DQ[7:0] and the data strobe signal DQS output from the data path 120 are supplied to either the channel CH1 or CH2 via either the second interface 102-1 or 102-2.

Hereinafter, the data signal DQ[7:0] received from the channel CH0 via the first interface 101 are sometimes referred to as data signal H_DQ[7:0]. In addition, the data strobe signal DQS received from the channel CH0 via the first interface 101 is sometimes referred to as a data strobe signal H_DQS. In addition, the data signal DQ[7:0] transmitted to the channel CH1 or CH2 via the second interface 102-1 or 102-2 is sometimes referred to as data signals N_DQ[7:0]. In addition, the data strobe signal DQS supplied to the channel CH1 or CH2 via the second interface 102-1 or 102-2 is sometimes referred to as a data strobe signal N_DQS.

The mask circuit 113 is a circuit capable of cutting off the supply of a signal to the memory chip CP in response to the bridge chip enable signal RG_CEn. During the period when the bridge chip enable signal RG_CEn is in the active state, the mask circuit 113 cuts off the supply of the signal to the memory chip CP. During the period when the bridge chip enable signal RG_CEn is in the inactive state, the mask circuit 113 transmits the signal to the memory chip CP. That is, the mask circuit 113 realizes switching between the bridge control mode and the non-bridge control mode based on the bridge chip enable signal RG_CEn. Note that the mask circuit 113 is configured using, for example, an AND circuit. The configuration of the mask circuit 113 is not limited thereto.

The register 114 is a memory in which various types of information (referred to as operation control information) for control of an operation of the bridge chip BC is written. The operation control information is not limited to specific information. For example, the operation control information may be setting information used for control of the bridge chip BC. The setting information is sent from the host HA and stored in the bridge chip BC. The controller 103 executes an operation according to the setting information. The setting information is, for example, size information 115 indicating a data transfer size.

Write of the size information 115 to the register 114 is executed in response to a command for register write from the host HA when the bridge chip BC is in the bridge control mode. This prevents the command for write of the size information 115 into the register 114 from reaching any memory chip CP.

In the bridge control mode, the bridge chip BC does not transmit any command from the host HA to the channels CH1 and CH2. Therefore, a command for operating the bridge chip BC in the bridge control mode can be arbitrarily defined. For example, the command for operating the bridge chip BC in the bridge control mode may be diverted from a command defined by the toggle DDR standard or may be a command defined without being bound by a specific standard. When a command defined by the toggle DDR standard is diverted, for example, a set feature command can be used to write the size information 115 in the register 114. Note that the command used to write the size information 115 in the register 114 is not limited thereto.

FIG. 2 is a schematic diagram illustrating a detailed configuration of the transceiver 112 according to the first embodiment. Note that, here, the data strobe signal DQS will be described as a representative of the data strobe signals DQS/DQSn transmitted and received by the transceiver 112, and the description of the data strobe signal DQSn will be omitted in order to simplify the description.

In addition to the data path 120, the transceiver 112 includes a multiplexer MUX1, a determination circuit 121, a delay circuit 122, a phase shift circuit 123, a duty cycle adjuster 124, and an oscillator circuit 125.

The data path 120 includes a plurality of D flip-flops FF (here, ten D flip-flops FF0e to FF4e and FF0o to FF4o), a D latch L0, and a multiplexer MUX2. Further, the D flip-flops FF0e, FF1e, FF0o, and FF1o constitute a sampler 126. The D flip-flops FF4e and FF4e, and the D latch L0 constitute a retimer 127. The retimer 127 is an example of a transmission circuit.

The sampler 126 changes a transfer scheme of the data signal H_DQ[7:0] from double-data-rate (DDR) to single-data-rate (SDR). By the sampler 126, the data signal H_DQ [7:0] are separated into a signal (referred to as an even signal) taken at a rising timing of a clock signal of the data path 120 (referred to as a data path clock) and a signal (referred to as an odd signal) taken at a falling timing of the data path clock.

The retimer 127 restores the data signal DQ[7:0] transferred in DDR based on each of the even signal and the odd signal transferred in SDR.

More specifically, the D flip-flops FF0e to FF4e are connected in series by D input terminals and Q output terminals of the respective D flip-flops FF. A data paths of the even signal (referred to as an even data path) is formed by the D flip-flops FF0e to FF4e connected in series. The D flip-flops FF0o to FF4o are connected in series by D input terminals and Q output terminals of the respective D flip-flops FF. A data paths of the odd signal (referred to as an odd data path) is formed by the D flip-flops FF0o to FF4o connected in series.

The data signal H_DQ[7:0] is input to the D input terminal of the D flip-flop FF0e, which is a start point of the even data path, and is input also to the D input terminal of the D flip-flop FF0o which is a start point of the odd data path, in parallel.

The multiplexer MUX2 includes two input terminals. The even signal output from the Q output terminal of the D flip-flop FF4e, which is an end point of the even data path, is input to one of the two input terminals of the multiplexer MUX2. The odd signal output from the Q output terminal of the D flip-flop FF4o, which is an end point of the odd data path, is input to the other one of the two input terminals of the multiplexer MUX2 via the D latch L0. The multiplexer MUX2 selects the input terminal to which the even signal is input when a selection signal is "1", and selects the input terminal to which the odd signal is input when the selection signal is "0".

The data path clock is input to clock input terminals of the D flip-flops FF0e to FF4e and FF0o to FF4o. A signal obtained by logically inverting the data path clock is input to the D flip-flop FF0o. The data path clock is input to a clock input terminal of the D latch L0. The data path clock is input to the multiplexer MUX2 as the selection signal.

Since the data path 120 is configured as above, the sampler 126 can convert the data signal H_DQ[7:0] received in DDR into each of the even signal and the odd signal which are signals in SDR. Further, the retimer 127 can restore the DDR data signal DQ[7:0] from the even signal and the odd signal. The transceiver 112 can transmit the data signal DQ[7:0] restored by the retimer 127 as a data signal N_DQ [7:0] via the delay circuit 122 configured to adjust the delay.

In addition, the D flip-flops FF0e to FF4e and FF0o to FF4o constitute a four-stage pipeline. Since the data path 120 has the pipeline, it is possible to transfer the data signal DQ[7:0] at a high frequency.

The oscillator circuit 125 is a circuit that oscillates an internal clock signal. The internal clock signal is an example of a clock signal supplied as a drive signal to the pipeline. The internal clock signal is denoted by I_CLK. The oscillator circuit 125 can be configured using, for example, a CR oscillator circuit. Note that the type of the oscillator circuit 125 is not limited to the CR oscillator circuit. Any kind of oscillator circuit can be adopted as the oscillator circuit 125.

The multiplexer MUX1 includes two input terminals. The data strobe signal H_DQS is input to one of the two input terminals of the multiplexer MUX1. The internal clock signal I_CLK oscillated by the oscillator circuit 125 is input to the other of the two input terminals of the multiplexer MUX1. An output signal of the multiplexer MUX1 is used as the data path clock. That is, the multiplexer MUX1 outputs a signal indicated by the selection signal between the data strobe signal H_DQS and the internal clock signal I_CLK as the data path clock.

The selection signal is supplied to the multiplexer MUX1 from the determination circuit 121. The determination circuit 121 causes the multiplexer MUX1 to output the data strobe signal H_DQS as the data path clock at the start of the input of the data strobe signal H_DQS. Furthermore, the determination circuit 121 determines whether the input of the data strobe signal H_DQS has ended. When the input of the data strobe signal H_DQS has not ended, the determination circuit 121 causes the multiplexer MUX1 to output the data strobe signal H_DQS as the data path clock. After the input of the data strobe signal H_DQS ends, the determination circuit 121 causes the multiplexer MUX1 to output the internal clock signal I_CLK as the data path clock.

Note that the multiplexer MUX1 and the determination circuit 121 constitute a supply circuit 130.

When the input of the data signal H_DQ[7:0] to the transceiver 112 ends, the input of the data strobe signal H_DQS also ends substantially at the same time. Therefore, when only the data strobe signal H_DQS is used as the data path clock, a part of the data signal H_DQ[7:0] remains in the pipeline of the data path 120 at the end of the input of the data strobe signal H_DQS. That is, it is difficult to transmit the entire data signal H_DQ[7:0] without leaving any residue.

In the first embodiment, the determination circuit 121 switches the data path clock from the data strobe signal H_DQS to the internal clock signal I_CLK when the input of the data strobe signal H_DQS ends. Therefore, it is possible to transmit the entire data remaining in the pipeline without leaving any residue at the end of the data strobe signal H_DQS.

A method for determining whether the toggle of the data strobe signal H_DQS has ended can be arbitrarily configured. Here, as an example, the determination circuit 121 counts the number of toggles of the data strobe signal H_DQS, and determines whether the toggle of the data strobe signal H_DQS has ended based on whether the count value reaches a threshold corresponding to the data transfer size.

More specifically, the determination circuit 121 reads the size information 115 stored in the register 114. The determination circuit 121 starts counting the number of toggles of the data strobe signal H_DQS when the toggle of the data strobe signal H_DQS starts. When the count value of the number of toggles of the data strobe signal H_DQS does not reach the threshold corresponding to the transfer size indicated by the size information 115, the determination circuit 121 determines that the input of the data strobe signal H_DQS has not ended. When the count value reaches the threshold corresponding to the transfer size indicated by the size information 115, the determination circuit 121 determines that the input of the data strobe signal H_DQS has ended.

Therefore, it is possible to compensate for the shortage of the number of toggles of the data strobe signal H_DQS by the internal clock signal I_CLK from the oscillator circuit 125. As a result, the data received as the data signal H_DQ[7:0] can be transmitted without leaving any residue.

Note that a period for selecting the internal clock signal I_CLK is arbitrarily determined. In one example, the period when the internal clock signal I_CLK is continuously selected as the data path clock is determined in advance by a designer according to the number of stages of the pipeline of the data path 120. For example, in the example illustrated in FIG. 2, the data path 120 forms a four-stage pipeline. Therefore, regarding the internal clock signal I_CLK, the determination circuit 121 continues to select the internal clock signal I_CLK as the data path clock during the period when the internal clock signals I_CLK for at least four cycles or more are output as the data path clocks.

The transceiver 112 can further transmit the data path clock as the data strobe signal N_DQS via the phase shift circuit 123 and the duty cycle adjuster 124. The phase shift circuit 123 is a circuit that shifts a phase of the data strobe signal N_DQS to delay the phase of the data strobe signal N_DQS by 90 degrees with respect to the data signal N_DQ[7:0]. The duty cycle adjuster 124 is a circuit that shapes the data strobe signal N_DQS such that a duty ratio of the data strobe signal N_DQS is 50%.

Next, an operation of the semiconductor storage device 1 according to the first embodiment will be described.

Figure 3:
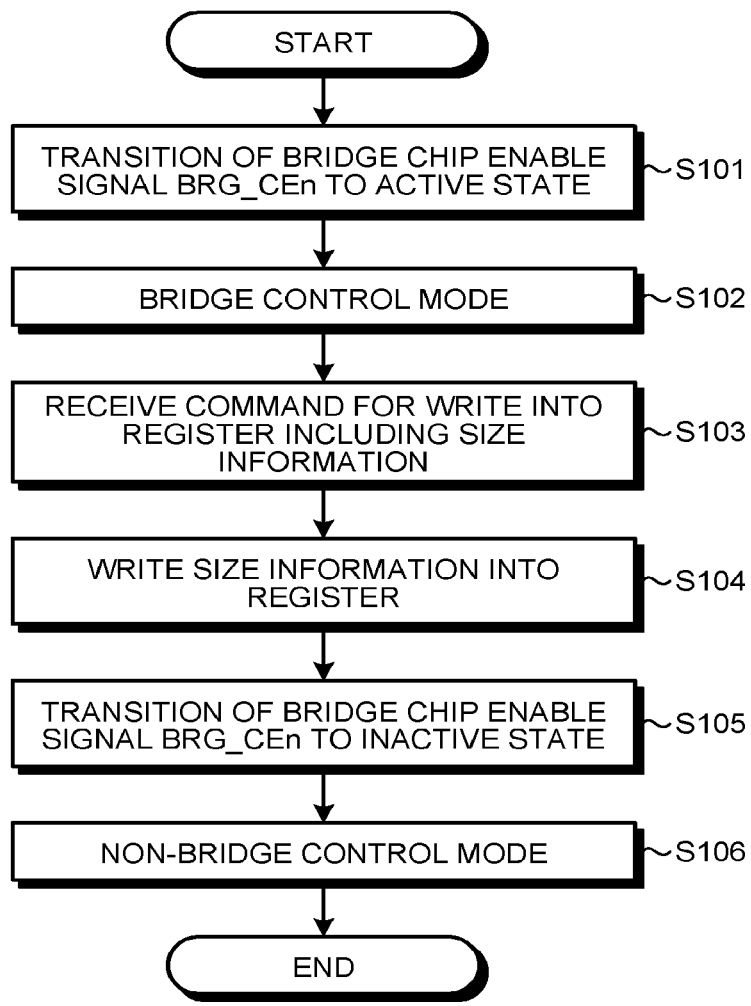
FIG. 3 is a flowchart illustrating an example of an operation regarding the setting of size information according to the first embodiment.

FIG. 3 is a flowchart illustrating an example of an operation regarding the setting of the size information 115 according to the first embodiment.

First, the host HA causes transition of the bridge chip enable signal RG_CEn from the inactive state (H level) to the active state (L level) (S101). Then, the controller 103 switches the operation mode of the bridge chip BC from the non-bridge control mode to the bridge control mode (S102).

In the bridge control mode, the bridge chip BC cuts off the transfer of signals to the channels CH1 and CH2 by the mask circuit 113. In addition, the bridge chip BC interprets a signal received from the host HA as the signal addressed to itself.

Subsequently, the bridge chip BC receives, from the host HA, the predetermined command for write into the register 114 including the size information 115 (S103). The command for write into the predetermined register 114 may be a command for existing register access, such as a set feature command, or may be a uniquely defined command.

In the bridge chip BC, the command decoder 111 interprets the received command as the command for write into the register 114, and the controller 103 executes an operation according to the interpretation result. That is, the controller 103 writes the size information 115 into the register 114 (S104).

Subsequently, the host HA changes the bridge chip enable signal RG_CEn from the active state (L level) to the inactive state (H level) (S105). Then, the controller 103 switches the operation mode of the bridge chip BC from the bridge control mode to the non-bridge control mode (S106). In the non-bridge control mode, the bridge chip BC can transfer a signal (command, address, or data) from the host HA to either the channel CH1 or CH2. As a result, the operation related to the setting of the size information 115 ends.

Figure 4:
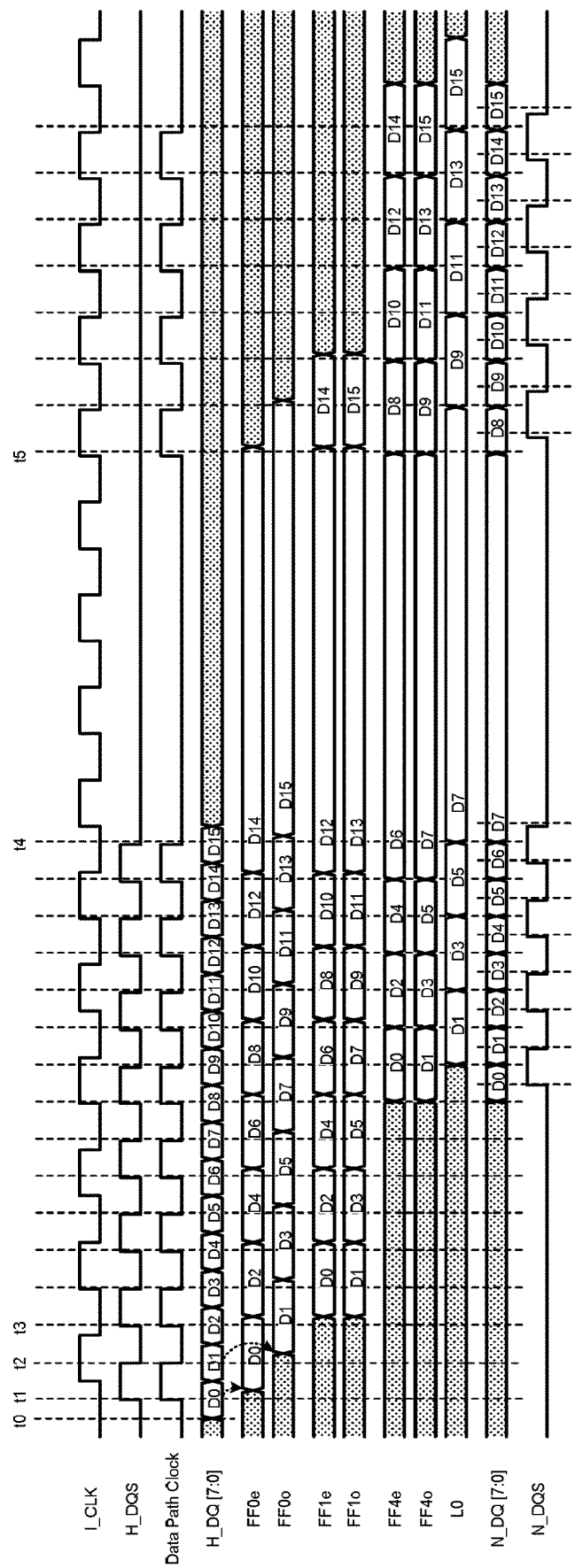
FIG. 4 is a timing chart for describing an operation of the transceiver according to the first embodiment.

FIG. 4 is a timing chart for describing an operation of the transceiver 112 according to the first embodiment. Here, as an example, a description will be given regarding a case where the transceiver 112 receives data (data D0 to D15) having a transfer length corresponding to the number of toggles of the data signal H_DQ[7:0] for eight cycles is received as the data signal H_DQ[7:0]. As the size information 115, a transfer size corresponding to the number of toggles of the data signal H_DQ[7:0] for eight cycles is recorded in advance.

In FIG. 4, a waveform of the internal clock signal I_CLK, a waveform of the data strobe signal H_DQS, a waveform of a data path clock, a waveform of the data signal H_DQ[7:0], a waveform of an output signal of the D flip-flop FF0e, a waveform of an output signal of the D flip-flop FF0o, a waveform of an output signal of the D flip-flop FF1e, a waveform of an output signal of the D flip-flop FF1o, a waveform of an output signal of the D flip-flop FF4e, a waveform of an output signal of the D flip-flop FF4o, a waveform of an output signal of the D latch L0, a waveform of the data signal N_DQ[7:0], and a waveform of the data strobe signal N_DQS are arrayed in this order.

First, input of the data signal H_DQ[7:0] starts (time t0), and input of the data strobe signal H_DQS starts with a phase delay of 90 degrees from the start timing of the input of the data signal H_DQ[7:0] (time t1).

During a certain period after time t1, the multiplexer MUX1 uses the data strobe signal H_DQS as a data path clock. In addition, the data strobe signal H_DQS is output from the transceiver 112 as the data strobe signal N_DQS.

At time t1, the D flip-flop FF0e takes and outputs the first data D0 at a rising timing of the data strobe signal H_DQS. The D flip-flop FF0o takes and outputs the next data D1 at a falling timing of the data strobe signal H_DQS that arrives subsequently (time t2).

At a rising timing of the data strobe signal H_DQS that arrives subsequently, each of the D flip-flop FF1e and the D flip-flop FF1o takes and outputs the output signal of the D flip-flop in the previous stage (time t3). As a result, both an even signal and an odd signal are signals in SDR that are transferred in synchronization with the rising of the data path clock.

Thereafter, until time t4 when the last data D15 is input, the D flip-flop FF0e takes and outputs of the even signal, and the D flip-flop FF0o takes and outputs data of the odd signal. Note that data D(2*i) forms the even signal in FIG. 4. In addition, data D(2*i+1) forms the odd signal. Here, i is an integer from 0 to 7.

At time t2 after a lapse of four cycles since time t1, the D flip-flop FF4e starts outputting the even signal, and the D flip-flop FF4o starts outputting the odd signal. The output signal of the D flip-flop FF4o is delayed by half a cycle by the D latch L0.

The multiplexer MUX2 switches the output signal between the even data output by the D flip-flop FF4e and the odd data output by the D latch L0 based on the data path clock to generate the data signal N_DQ[7:0].

At time t4, the determination circuit 121 determines that the input of the data strobe signal H_DQS has ended. The determination circuit 121 operates the multiplexer MUX1 to switch the data path clock from the data strobe signal H_DQS to the internal clock signal I_CLK.

Figure 5:
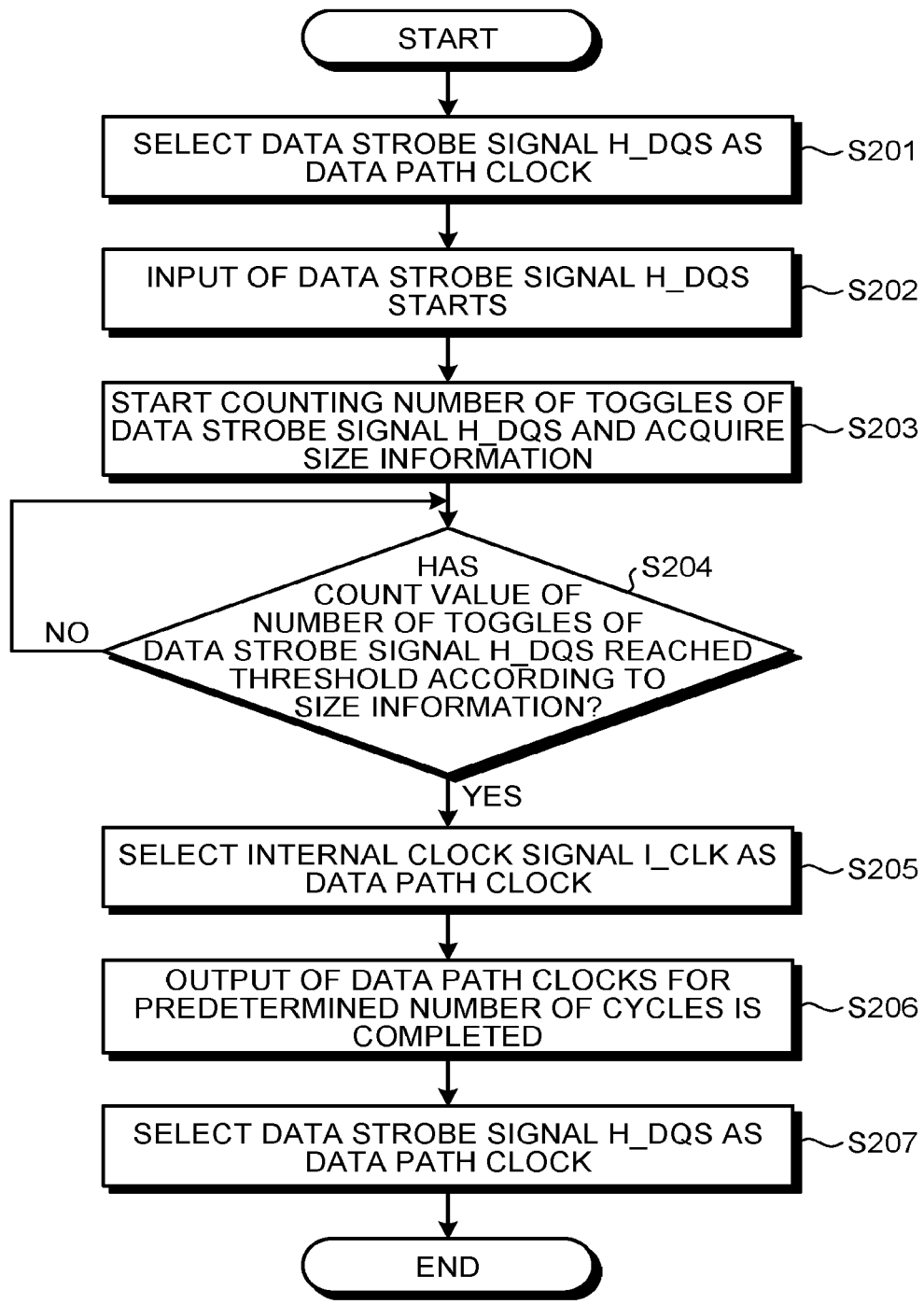
FIG. 5 is a flowchart illustrating an example of an operation of a supply circuit according to the first embodiment.

FIG. 5 is a flowchart illustrating an example of an operation of the supply circuit 130 according to the first embodiment;

The determination circuit 121 causes the multiplexer MUX1 to select the data strobe signal H_DQS in the initial state (for example, the state at time t0 in FIG. 4). That is, the supply circuit 130 is in a state where the data strobe signal H_DQS can be supplied as a data path clock (S201). When input of the data strobe signal H_DQS starts (S202), the determination circuit 121 starts counting the number of toggles of the data strobe signal H_DQS and acquires the size information 115 (S203). The determination circuit 121 determines whether a count value has reached the threshold according to the size information 115 (S204).

According to the example illustrated in FIG. 4, a transfer size corresponding to the data strobe signals H_DQS for eight cycles is recorded as the size information 115. Therefore, the determination circuit 121 determines whether the count value of the number of toggles of the data strobe signal H_DQS has reached "8" in S204. Note that it is assumed here that one toggle is constituted by a pair of rising and falling.

When the count value of the number of toggles of the data strobe signal H_DQS has not reached the threshold (S204: No), the determination circuit 121 executes S204 again. When the count value of the number of toggles of the data strobe signal H_DQS has reached the threshold (S204: Yes), the determination circuit 121 switches the data path clock from the data strobe signal H_DQS to the internal clock signal I_CLK (S205).

When the output of data path clocks for a predetermined number of cycles (for example, the number of cycles according to the number of stages of the pipeline of the data path 120) is completed after the completion of the switching of the data path clock (S206), the determination circuit 121 switches the data path clock from the internal clock signal I_CLK to the data strobe signal H_DQS (S207). Then, the operation of the determination circuit 121 ends.

The description will be given with reference to FIG. 4 again.

At time t4, it is determined that the input of the data strobe signal H_DQS has ended. At this point, data for four cycles, specifically data D8 to D15, remain in the pipeline and have not yet been transmitted.

The determination circuit 121 operates the multiplexer MUX1 to switch the data path clock from the data strobe signal H_DQS to the internal clock signal I_CLK at time t4. Then, the switching is completed at time t5, and the output of the internal clock signal I_CLK as the data path clock starts. As a result, the data strobe signal N_DQS is switched from the data strobe signal H_DQS to the internal clock signal I_CLK.

After time t5, data path clocks for four cycles are supplied to the data path 120, such that the data D8 to D15 remaining in the pipeline are transmitted. When the transmission of the data D15, which is the data received last, is completed, the determination circuit 121 can return the data path clock from the internal clock signal I_CLK to the data strobe signal H_DQS.

As described above, the sampler 126 takes the data signal H_DQ[7:0] at a timing based on the data strobe signal H_DQS according to the first embodiment. The pipeline constituted by the D flip-flops FF0e to FF4e and FF0o to FF4o transfers the data signal H_DQ[7:0] taken by the sampler 126 using a drive signal. The retimer 127, which is a transmission circuit, acquires and transmits the data signal H_DQ[7:0] that has passed through the pipeline. The supply circuit 130 supplies the data strobe signal H_DQS to the pipeline as the drive signal during a period when the data strobe signal H_DQS is input. The supply circuit 130 supplies the internal clock signal I_CLK as the drive signal to the pipeline after the input of the data strobe signal H_DQS ends.

Since the transceiver 112 has the pipeline, high-speed data transfer is possible. Furthermore, the transceiver 112 can transmit the received data signal without leaving any residue.

In addition, the supply circuit 130 determines the end of the input of the data strobe signal H_DQS based on the count of the number of toggles of the data strobe signal H_DQS according to the first embodiment.

Therefore, the supply circuit 130 can promptly detect the end of the input of the data strobe signal H_DQS when the input of the data strobe signal H_DQS ends.

Note that the above description has been given assuming that the bridge chip BC can receive the command for write of the size information 115 in the bridge control mode. It may be configured such that the bridge chip BC can receive a command for write of the size information 115 in the non-bridge control mode.

In addition, the description has been given assuming that the operation mode of the bridge chip BC is controlled by the bridge chip enable signal RG_CEn. A control method of the operation mode of the bridge chip BC is not limited thereto. For example, it may be configured such that the host HA can transmit a dedicated command for controlling the operating mode of the bridge chip BC, and the bridge chip BC changes the operation mode according to the dedicated command.

In addition, the bridge chip BC does not necessarily switch the operation mode between the bridge control mode and the non-bridge control mode. The bridge chip BC can be arbitrarily configured as long as the host HA can set the size information 115 to the bridge chip BC with any method.

(First Modification)

There are various methods as a method for determining whether the input of the data strobe signal H_DQS has ended. In a first modification, another example of the method for determining whether the input of the data strobe signal H_DQS has ended will be described.

Figure 6:
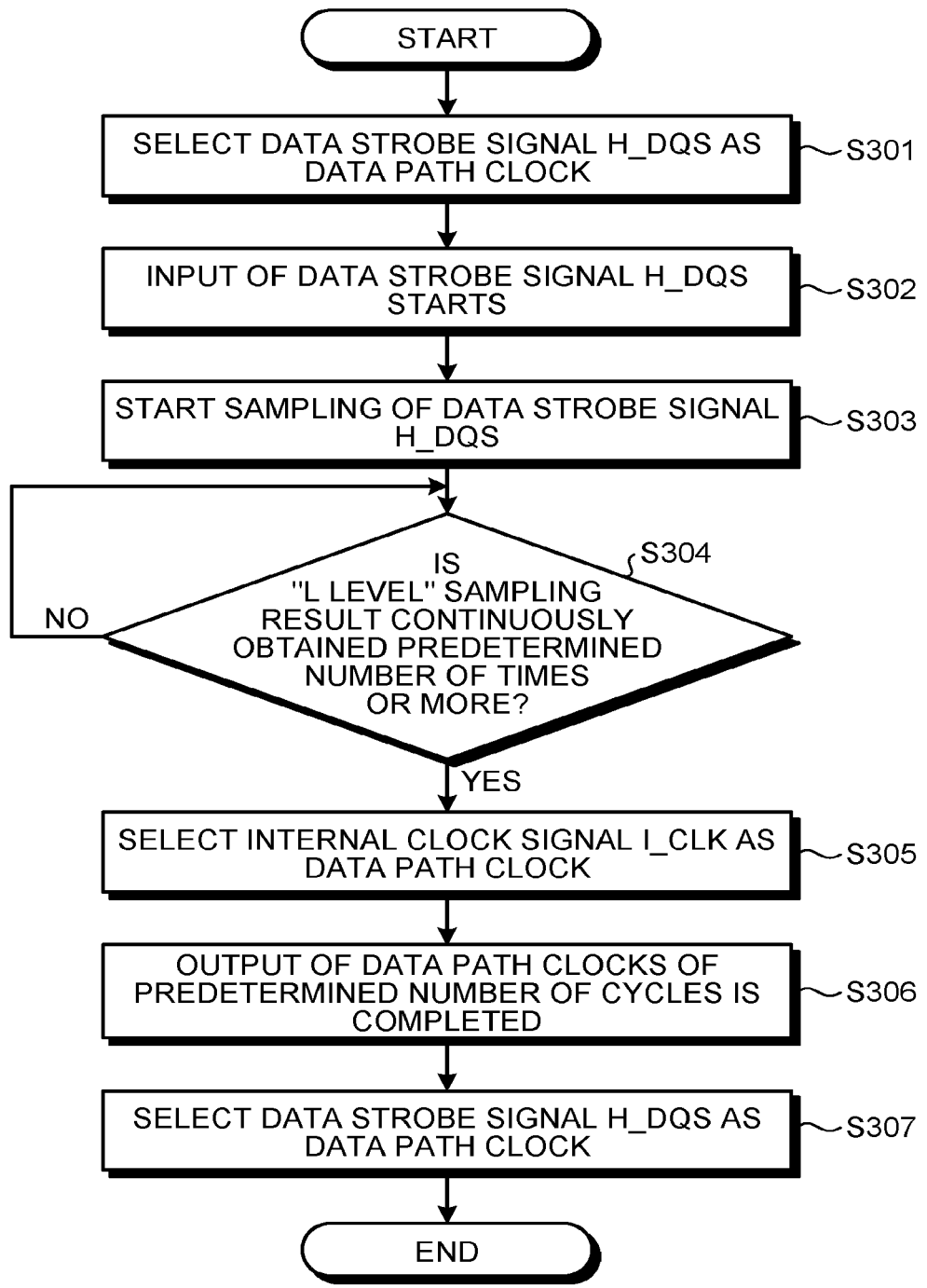
FIG. 6 is a flowchart illustrating an example of the operation of the supply circuit according to a first modification of the first embodiment.

FIG. 6 is a flowchart illustrating an example of the operation of the supply circuit 130 according to a first modification of the first embodiment.

The determination circuit 121 causes the multiplexer MUX1 to select the data strobe signal H_DQS in the initial state (for example, the state at time t0 in FIG. 4). That is, the supply circuit 130 is in a state where the data strobe signal H_DQS can be supplied as a data path clock (S301). When input of the data strobe signal H_DQS starts (S302), the determination circuit 121 starts sampling of the data strobe signal H_DQS (S303).

The sampling is performed continuously a plurality of times. The timing of each sampling is arbitrary. For example, the internal clock signal I_CLK and the data strobe signal H_DQS are set to be asynchronous, and the determination circuit 121 can sample the data strobe signal H_DQS at the rising, falling, or both the timings of the internal clock signal I_CLK.

After the input of the data strobe signal H_DQS ends, the data strobe signal H_DQS is maintained at the L level thereafter. Therefore, an "L level" sampling result is to be obtained continuously. The determination circuit 121 determines whether the "L level" sampling result is continuously obtained a predetermined number of times or more (S304). When the "L level" sampling result is not continuously obtained the predetermined number of times or more (S304: No), the determination circuit 121 executes S304 again. When the "L level" sampling result is obtained consecutively the predetermined number of times or more (S304: Yes), the end of the input of the data strobe signal H_DQS is estimated, and thus, the determination circuit 121 switches the data path clock from the data strobe signal H_DQS to the internal clock signal I_CLK (S305). Then, the same processing as in S206 and S207 is executed in S306 and S307.

In this manner, the determination circuit 121 may determine the end of the input of the data strobe signal H_DQS by sampling the data strobe signal H_DQS.

(Second Modification)

In a second modification, still another example of the method for determining whether the input of the data strobe signal H_DQS has ended will be described.

Figure 7:
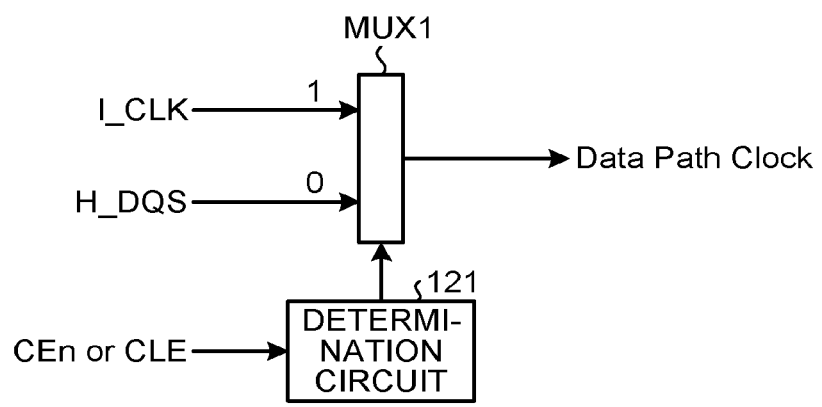
FIG. 7 is a schematic diagram illustrating an example of a configuration of a determination circuit according to a second modification of the first embodiment.

As illustrated in FIG. 7, the chip enable signal CEn or the command latch enable signal CLE from the channel CH0 is input to the determination circuit 121. The host HA uses the chip enable signal CEn and the command latch enable signal CLE at the time of inputting the next command.

When the host HA inputs one command and then inputs the next command, the chip enable signal CEn and the command latch enable signal CLE are operated to input the next command. For example, in a case where the data signal H_DQ[7:0] and the data strobe signal H_DQS are input from the host HA along with a write command, and then, the chip enable signal CEn or the command latch enable signal CLE fluctuates, the input of the data signal H_DQ[7:0] and the data strobe signal H_DQS has already ended when the chip enable signal CEn or the command latch enable signal CLE fluctuates.

The determination circuit 121 monitors the chip enable signal CEn or the command latch enable signal CLE, and determines that the input of the data strobe signal H_DQS has ended when detecting a fluctuation in the chip enable signal CEn or the command latch enable signal CLE. Then, the determination circuit 121 switches a data path clock from the data strobe signal H_DQS to the internal clock signal I_CLK.

In this manner, the determination circuit 121 may be configured to determine the end of the input of the data strobe signal H_DQS based on the chip enable signal CEn or the command latch enable signal CLE.

(Third Modification)

In a third modification, still another example of the method for determining whether the input of the data strobe signal H_DQS has ended will be described.

Figure 8:
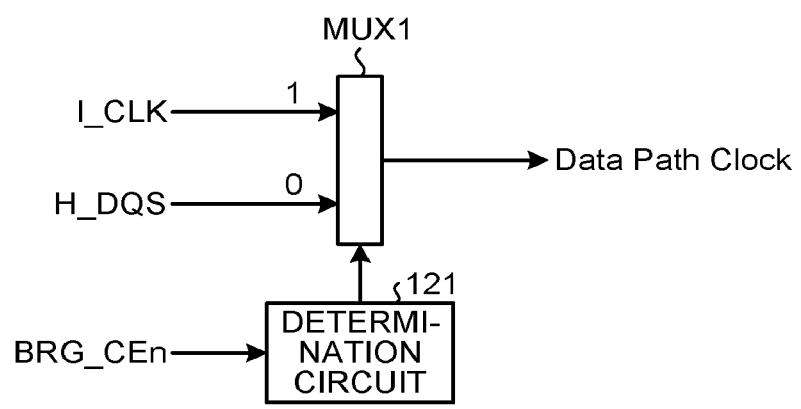
FIG. 8 is a schematic diagram illustrating an example of a configuration of a determination circuit according to a third modification of the first embodiment.

As illustrated in FIG. 8, the bridge chip enable signal RG_CEn from the channel CH0 is input to the determination circuit 121. When the transmission of the data strobe signal H_DQS is completed, the host HA toggles the bridge chip enable signal RG_CEn a predetermined number of times (for example, once). When detecting the toggle of the bridge chip enable signal RG_CEn, the determination circuit 121 determines that the input of the data strobe signal H_DQS has ended, and switches a data path clock from the data strobe signal H_DQS to the internal clock signal I_CLK.

In this manner, the determination circuit 121 may be configured to be capable of receiving the notification that the input of the data strobe signal H_DQS has ended from the host HA by the bridge chip enable signal RG_CEn.

Second Embodiment

In a second embodiment, a first-in first-out (FIFO) memory is provided at the beginning of a data path. Further, the data path has a pipeline configuration. A transceiver takes the received data signal H_DQ[7:0] into the FIFO memory at a timing based on the data strobe signal H_DQS. Then, the transceiver uses the internal clock signal I_CLK to take the data signal H_DQ[7:0] from the FIFO memory and drive the pipeline. As a result, a frequency of data transfer can be increased by the pipeline configuration, and the received data signal H_DQ[7:0] can be transmitted without leaving any residue.

The transceiver provided in a bridge chip of a semiconductor storage device according to the second embodiment is referred to as a transceiver 112a. Here, points different from the first embodiment will be described. The same configurations as those of the first embodiment are denoted by the same reference signs as those of the first embodiment. The same configurations as those of the first embodiment will be briefly described or will not be described.

Figure 9:
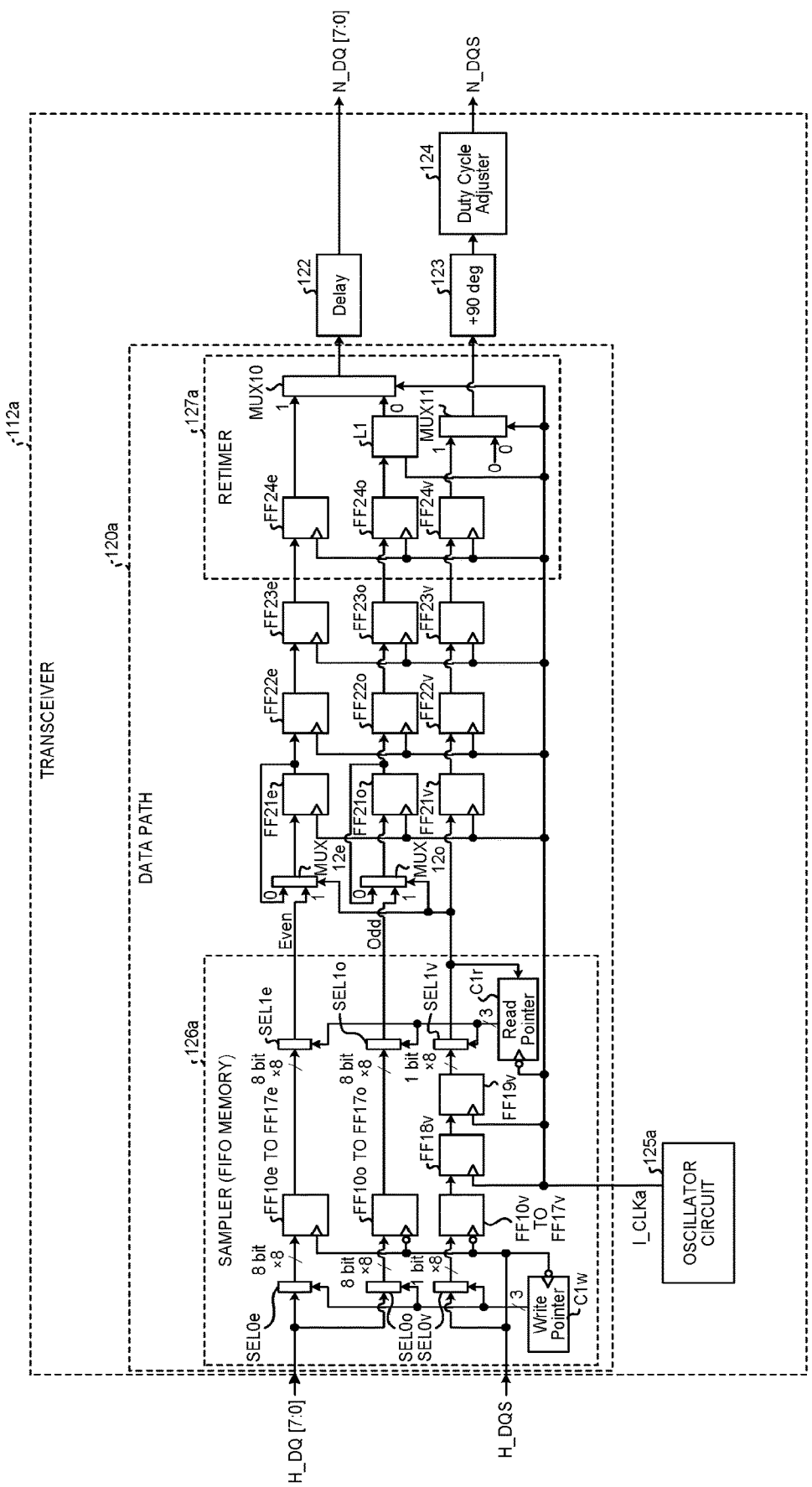
FIG. 9 is a schematic diagram illustrating a detailed configuration of a transceiver according to a second embodiment.

FIG. 9 is a schematic diagram illustrating a detailed configuration of the transceiver 112a according to the second embodiment; Even in this drawing, the data strobe signal DQS will be described as a representative of the data strobe signals DQS/DQSn transmitted and received by the transceiver 112a, and the description of the data strobe signal DQSn will be omitted.

The transceiver 112a includes a data path 120a, the delay circuit 122, the phase shift circuit 123, the duty cycle adjuster 124, and an oscillator circuit 125a. The data path 120a includes a sampler 126a and a retimer 127a.

The sampler 126a has selectors SEL0e, SEL1e, SEL0o, SEL1o, SEL0v, and SEL1v, D flip-flops FF10e to FF17e, FF10o to FF17o, FF10v to FF17v, FF18v, and FF19v, a counter C1w, and a counter C1r.

The data signal H_DQ[7:0] is input to the selector SEL0e and is input also to the selector SEL0o, in parallel.

The selector SEL0e has eight output terminals. The eight output terminals of the selector SEL0e are respectively connected one-to-one with D input terminals of the eight D flip-flops FF10e to FF17e. The selector SEL1e has eight input terminals. The eight input terminals of the selector SEL1e are respectively connected one-to-one with Q output terminals of the eight D flip-flops FF10e to FF17e. When a selection signal input to the selector SEL0e and a selection signal input to the selector SEL1e have the same value, an output destination of data from the selector SEL0e and an input source of data to the selector SEL1e are configured to be equal.

The selector SEL0o has eight output terminals. The eight output terminals of the selector SEL0o are respectively connected one-to-one with D input terminals of the eight D flip-flops FF10o to FF17o. The selector SEL1o has eight input terminals. The eight output terminals of the selector SEL1o are respectively connected one-to-one with Q input terminals of the eight D flip-flops FF10o to FF17o. When a selection signal input to the selector SEL0o and a selection signal input to the selector SEL1o have the same value, an output destination of data from the selector SEL0o and an input source of data to the selector SEL1o are configured to be equal.

The data strobe signal H_DQS is input to clock input terminals of the eight D flip-flops FF10e to FF17e. Therefore, the eight D flip-flops FF10e to FF17e can acquire an even signal among the data signal H_DQ[7:0] received in DDR.

A signal obtained by logically inverting the data strobe signal H_DQS is input to the clock input terminals of the eight D flip-flops FF10o to FF17o. Therefore, the eight D flip-flops FF10o to FF17o can acquire an odd signal among the data signal H_DQ[7:0] received in DDR.

The counter C1w holds a write pointer with a bit width of three bits. The write pointer is incremented by one by a signal obtained by logically inverting the data strobe signal H_DQS. A value of the write pointer held by the counter C1w is input to the selectors SEL0e, SEL0o, and SEL0v as the selection signal.

The counter C1r holds a read pointer with a bit width of three bits. The read pointer is incremented by one by a signal obtained by inverting the internal clock signal I_CLKa. A value of the write pointer held by the counter C1r is input to the selectors SEL1e, SEL1o, and SEL0v as the selection signal.

The sampler 126a sequentially takes the even signals among the data signal H_DQ[7:0] into the eight D flip-flops FF10e to FF17e, and sequentially takes the odd signals among the data signal H_DQ[7:0] into the eight D flip-flops FF10o to FF17o. Furthermore, the sampler 126a can sequentially output the even signals taken in the eight D flip-flops FF10e to FF17e to an even data path and the odd signals taken in the eight D flip-flops FF10o to FF17o to an odd data path. The data is taken to the eight D flip-flops FF10e to FF17e and the eight D flip-flops FF10o to FF17o at a timing based on the data strobe signal H_DQS. In addition, the data is output from the eight D flip-flops FF10e to FF17e and the eight D flip-flops FF10o to FF17o at a timing based on the internal clock signal I_CLKa. That is, the sampler 126a functions as the FIFO memory that takes the data signal H_DQ[7:0] at the timing based on the data strobe signal H_DQS and outputs the data signal H_DQ[7:0] at the timing based on the internal clock signal I_CLKa.

The data strobe signal H_DQS is input to the selector SEL0v. The selector SEL0v has eight output terminals. The eight output terminals of the selector SEL0v are respectively connected one-to-one with D input terminals of the eight D flip-flops FF10v to FF17v.

Furthermore, a signal obtained by logically inverting the data strobe signal H_DQS is input to clock input terminals of the eight D flip-flops FF10v to FF17v. Therefore, each of the eight D flip-flops FF10v to FF17v can take "1" when the data strobe signal H_DQS is input in a case of being selected as an output destination from the selector SEL0v. The data "1" taken by each of the eight D flip-flops FF10v to FF17v is referred to as a valid flag. The valid flag is used as a signal indicating that the data signal H_DQ[7:0] has been normally taken in the same cycle as a cycle in which the valid flag is taken.

The selector SEL1v has eight input terminals. Output signals from the Q output terminals of the eight D flip-flops FF10v to FF17v pass through the D flip-flops FF18v and FF19v and are input to any of the eight input terminals provided by the selector SEL1v.

The D flip-flop as an output destination of data from the selector SEL0v among the eight D flip-flops FF10v to FF17v and the D flip-flop taking data input to the selector SEL1v among the eight D flip-flops FF10v to FF17v are configured to be equal when the selection signal input to the selector SEL0v and the selection signal input to the selector SEL1v have the same value.

The internal clock signal I_CLKa is input to clock input terminals of the D flip-flops FF18v and FF19v. In addition, the counter C1r counts up the read pointer one by one by the signal obtained by inverting the internal clock signal I_CLKa. Furthermore, the read pointer is input to the selectors SEL1e, SEL1o, and SEL1v as the selection signal. Therefore, the even signal, the odd signal, and the valid flag from the sampler 126a serving as the FIFO memory are output at the timing based on the internal clock signal I_CLKa.

The oscillator circuit 125a oscillates the internal clock signal I_CLKa. The oscillator circuit 125 may be configured using, for example, a CR circuit. Note that the type of the oscillator circuit 125 is not limited to the CR circuit. Any kind of oscillator circuit can be adopted as the oscillator circuit 125.

A frequency of the internal clock signal I_CLKa is set to be slightly higher than frequencies of the data signal H_DQ[7:0] and the data strobe signal H_DQS in order to prevent overflow of data held in the sampler 126a serving as the FIFO memory.

The data path 120a includes D flip-flops FF21e to FF24e and FF21o to FF24o, a D latch L1, and a multiplexer MUX11.

The D flip-flops FF21e to FF24e are connected in series by D input terminals and Q output terminals of the respective D flip-flops FF. An even data path having a pipeline configuration is constituted by the D flip-flops FF21e to FF24e connected in series. The D flip-flops FF21o to FF24o are connected in series by D input terminals and Q output terminals of the respective D flip-flops FF. An odd data path having a pipeline configuration is constituted by the D flip-flops FF21o to FF24o connected in series.

The multiplexer MUX11 has two input terminals. The even signal output from the Q output terminal of the D flip-flop FF24e, which is an end point of the even data path, is input to one of the two input terminals of the multiplexer MUX11. The odd signal output from the Q output terminal of the D flip-flop FF24o, which is an end point of the odd data path, is input to the other one of the two input terminals of the multiplexer MUX11 via the D latch L1. The multiplexer MUX11 selects the even signal when the selection signal is "1 or selects the odd signal when the selection signal is "0", and outputs the selected signal.

The internal clock signal I_CLKa is input to clock input terminals of the D flip-flops FF21e to FF24e and FF21o to FF24o, and a clock input terminal of the D latch L1. In addition, the internal clock signal I_CLKa is input to the multiplexer MUX11 as the selection signal.

The D flip-flops FF24e and FF24o, the D latch L1, and the multiplexer MUX11 are included in the retimer 127a. The retimer 127a can restore the DDR data signal DQ[7:0] from the even signal and the odd signal with the above configuration. The transceiver 112a can transmit the data signal DQ[7:0] restored by the retimer 127a as the data signal N_DQ[7:0] via the delay circuit 122.

The transceiver 112a further includes multiplexers MUX12e and MUX12o. Each of the multiplexers MUX12e and MUX12o has two input terminals.

The multiplexer MUX12e is arranged between the selector SEL1e and the D flip-flop FF21e. The even signal output by the selector SEL1e is input to one of the two input terminals of the multiplexer MUX12e. The even signal output by the D flip-flop FF21e is input to the other of the two input terminals of the multiplexer MUX12e. An output signal of the multiplexer MUX12e is input to the D input terminal of the D flip-flop FF21e. The multiplexer MUX12e outputs the even signal input from the selector SEL1e when the selection signal is "1", and outputs the even signal input from the D flip-flop FF21e when the selection signal is "0".

The multiplexer MUX12o is arranged between the selector SEL1o and the D flip-flop FF21o. The odd signal output by the selector SEL1o is input to one of the two input terminals of the multiplexer MUX12o. The odd signal output by the D flip-flop FF21o is input to the other of the two input terminals of the multiplexer MUX12o. An output signal of the multiplexer MUX12o is input to the D input terminal of the D flip-flop FF21o. The multiplexer MUX12o outputs the odd signal input from the selector SEL1o when the selection signal is "1", and outputs the odd signal input from the D flip-flop FF21o when the selection signal is "0".

The output signal from the selector SEL1v is input to the multiplexers MUX12e and MUX12o as the selection signal. In other words, during a period when the valid flag is output from the sampler 126a, the D flip-flop FF21e and the D flip-flop FF21o can take and output the even signal from the sampler 126a and the odd signals from the sampler 126a, respectively. During a period when the valid flag is not output from the sampler 126a, the D flip-flop FF21e and the D flip-flop FF21o can take and output the even signal output by the D flip-flop FF21e and the odd signals output by the D flip-flop FF21o, respectively. That is, the D flip-flops FF21e and FF21o continue to output the immediately previously taken values during the period when the valid flag is not output from the sampler 126a.

As described above, the frequency of the internal clock signal I_CLKa is slightly higher than the frequencies of the data signal H_DQ[7:0] and the data strobe signal H_DQS. Therefore, underflow of data held in the sampler 126a serving as a FIFO memory is likely to occur. If the underflow occurs, it is possible to transmit each of the even signal and the odd signal in a short time with the functions of the multiplexer MUX12e and MUX12o.

The transceiver 112a includes D flip-flops FF21v to FF24v and the multiplexer MUX11. Note that the D flip-flop FF24v and the multiplexer MUX11 are included in the retimer 127a.

The D flip-flops FF21v to FF24v are connected in series by D input terminals and Q output terminals of the respective D flip-flops FF. The D flip-flops FF21v to FF24v constitute a data path of the valid flag (referred to as a valid data path). The internal clock signal I_CLKa is input to clock input terminals of the D flip-flops FF21v to FF24v.

The multiplexer MUX11 has two input terminals. An output signal from the Q output terminal of the D flip-flop FF24v, which is an end point of the valid data path, is input to one of the two input terminals of the multiplexer MUX11. The signal "0" is input to the other of the two input terminals of the multiplexer MUX11. The multiplexer MUX11 selects the output signal from the valid data path when the selection signal is "1" or the signal "0" when the selected signal is "0", and outputs the selected signal.

The internal clock signal I_CLKa is input to the multiplexer MUX11 as the selection signal. During a period when the valid flag "1" is input from the valid data path, the multiplexer MUX11 outputs a signal synchronized with the internal clock signal I_CLKa. During a period when the valid flag "1" is not input from the valid data path, the multiplexer MUX11 outputs a signal at the L level.

The transceiver 112a transmits the output signal of the multiplexer MUX11 as the data strobe signal N_DQS via the phase shift circuit 123 and the duty cycle adjuster 124.

Therefore, the retimer 127a can output a signal toggled by the same number as the data strobe signal H_DQS as the data strobe signal N_DQS.

Figure 10:
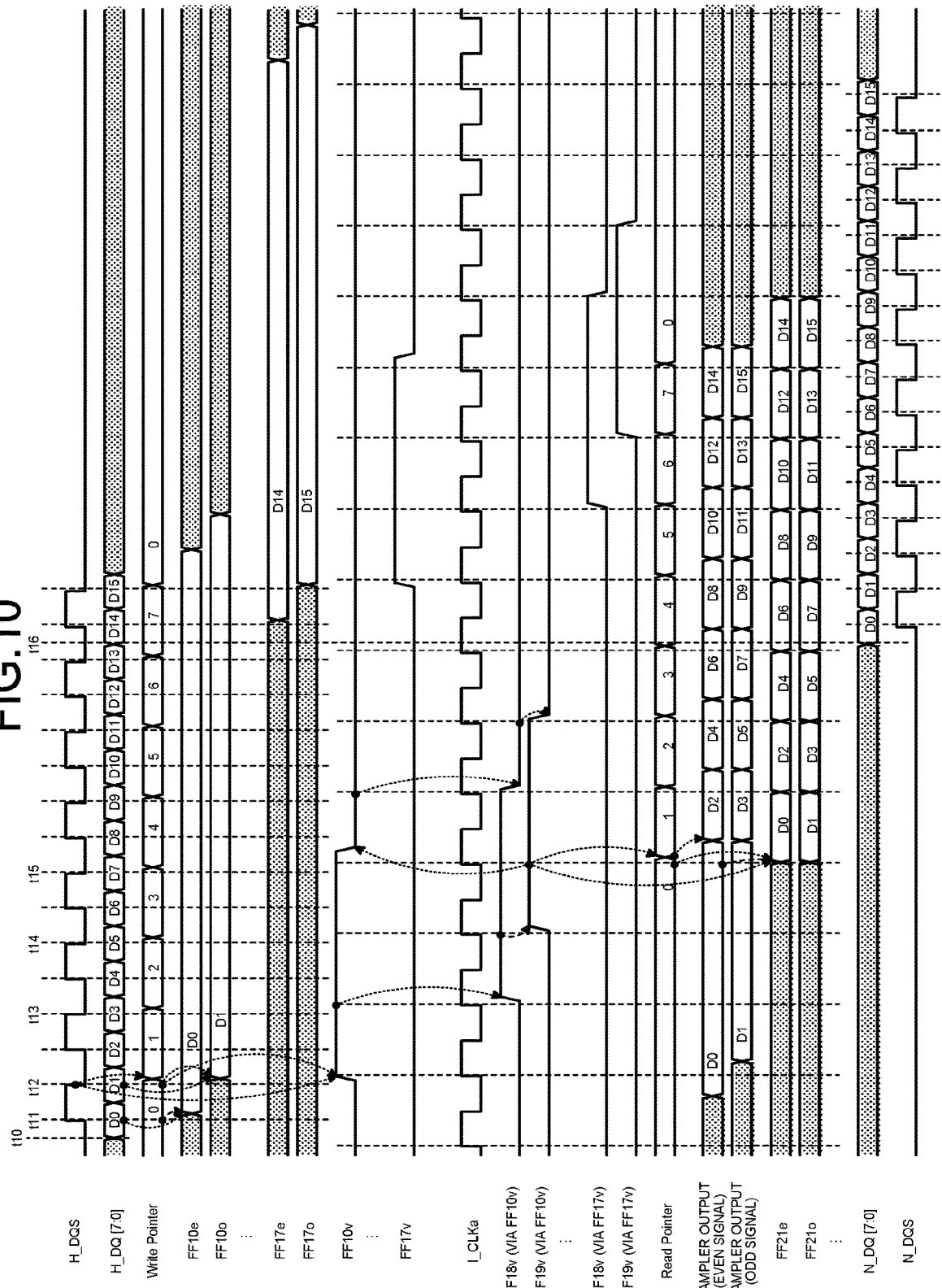
FIG. 10 is a timing chart for describing an operation of the transceiver according to the second embodiment.

FIG. 10 is a timing chart for describing an operation of the transceiver 112a according to the second embodiment. Here, as an example, a description will be given regarding a case where the transceiver 112a receives data (data D0 to D15) having a transfer length corresponding to the number of toggles of the data signal H_DQ[7:0] for eight cycles is received as the data signal H_DQ[7:0]. In addition, it is assumed that each of the D flip-flops FF(10+mod(i, 8))e, FF(10+mod(i, 8))o, and FF(10+mod(i, 8))v is selected by the pointer if a value of the pointer (write pointer or read pointer) is "i". Here, mod (a, b) indicates the remainder obtained by dividing "a" by "b".

In FIG. 10, a waveform of the data strobe signal H_DQS, a waveform of the data signal H_DQ[7:0], a value of the write pointer, a waveform of an output signal of the D flip-flop FF10e, a waveform of an output signal of the D flip-flop FF10o, a waveform of an output signal of the D flip-flop FF17e, a waveform of an output signal of the D flip-flop FF17o, a waveform of an output signal of the D flip-flop FF10v, a waveform of an output signal of the D flip-flop FF17v, a waveform of the internal clock signal I_CLKa, a waveform of an output signal of the D flip-flop FF18v via the D flip-flop FF10v, a waveform of an output signal of the D flip-flop FF19v via the D flip-flop FF10v, a waveform of an output signal of the D flip-flop FF18v via the D flip-flop FF17v, a waveform of an output signal of the D flip-flop FF19v via the D flip-flop FF17v, a value of the read pointer, a waveform of an even signal output by the sampler 126a, a waveform of an odd signal output by the sampler 126a, a waveform of an output signal of the D flip-flop FF21e, a waveform of an output signal of the D flip-flop FF21o, a waveform of the data signal N_DQ[7:0], and a waveform of the data strobe signal N_DQS are arrayed in this order.

First, input of the data signal H_DQ[7:0] starts (time t10), input of the data strobe signal H_DQS starts with a phase delay of 90 degrees from a start timing of the input of the data signal H_DQ[7:0] (time t11).

At time t11, the D flip-flops FF10e, FF10o, and FF10v are selected by the write pointer. Therefore, the D flip-flop FF10e takes the first data D1 at the first rising timing of the data strobe signal N_DQS (time t11). The D flip-flop FF10o takes the first data D2 at the first falling timing (time t12) of the data strobe signal N_DQS. In addition, the D flip-flop FFl0v takes the valid flag, that is data "1" at the first falling timing of the data strobe signal N_DQS (time t12).

At time t12, a value of the write pointer is incremented by one as the data strobe signal N_DQS falls. As a result, the D flip-flops FF11e, FFl0o, and FF11v are selected in this state. At the subsequent rising timing or falling timing of the data strobe signal N_DQS, data D2 and D3, and the valid flag are taken in the D flip-flops FF11e, FF10o, and FF11v.

Thereafter, the even signal, the odd signal, and the valid flag are taken into the sampler 126a serving as the FIFO memory every cycle by the same procedure as above.

At time t11, the D flip-flops FF10e, FFl0o, and FFl0v are selected by the read pointer. Therefore, the sampler 126a outputs the data D0 as the even signal in response to the D flip-flop FF10e taking the data D0 and outputs the data D1 as the odd signal in response to the D flip-flop FF10o taking the data D1.

The valid flag taken by the D flip-flop FF10v at time t12 is taken by the D flip-flop FF18v at time t13 one cycle after time t12. The valid flag taken by the D flip-flop FF18v from the D flip-flop FF10v at time t13 is taken by the D flip-flop FF19v at time t14 one cycle after the time t13.

At time t15, one cycle after time t14, the valid flag from the D flip-flop FF10v taken by the D flip-flop FF19v is input to the multiplexers MUX12e and MUX12o as the selection signal. That is, the multiplexer MUX12e can output the even signal input from the sampler 126a. The multiplexer MUX12o can output the odd signal input from the sampler 126a. Therefore, the D flip-flop FF21e, which is the start point of the even data path, and the D flip-flop FF21o, which is the start point of the odd data path, start acquiring data at time t15. At time t15, the D flip-flop FF21e takes the data D0 and the D flip-flop FF21o takes the data D1.

In addition, the read pointer is incremented as the valid flag from the D flip-flop FF10v taken by the D flip-flop FF19v is input to the counter C1r at time t15. As a result, the sampler 126a switches the even signal from the data D0 to the data D2 and the odd signal from the data D1 to the data D3 at a timing slightly delayed from the time t15.

Thereafter, the sampler 126a sequentially output a pair of the data D4 and data D5, a pair of the data D6 and data D7, a pair of the data D8 and data D9, a pair of the data D10 and data D11, a pair of the data D12 and data D13, and a pair of the data D14 and data D15 every cycle.

Each pair of data is transferred to the retimer 127a with the valid flag. In the retimer 127, from time t16, the multiplexer MUX10 switches the output signal between the even data output by the D flip-flop FF24e and the odd data output by the D latch L1 based on the internal clock signal I_CLKa to generate the data signal N_DQ[7:0]. In addition, the multiplexer MUX11 switches the output signal between the valid flag and the signal "0" based on the internal clock signal I_CLKa during the period when the valid flag is input to generate the data strobe signal N_DQS.

As described above, the sampler 126a serves as the FIFO memory according to the second embodiment. The sampler 126a stores the data signal H_DQ[7:0] taken at the timing based on the data strobe signal H_DQS in the FIFO memory. In addition, the sampler 126a inputs the data signal stored in the FIFO memory to the pipeline constituted by the D flip-flops FF21e to FF24e and FF21o to FF24o at the timing based on the internal clock signal I_CLKa. The pipeline transfers the data signal H_DQ[7:0] using the internal clock signal I_CLKa.

Even in the second embodiment, the transceiver 112a has the pipeline, and thus, high-speed data transfer is possible. Furthermore, the transceiver 112a uses the internal clock signal I_CLKa instead of the data strobe signal H_DQS as the signal for driving the pipeline, and thus, can transmit the received data signal without leaving any residue.

In addition, the sampler 126a takes the valid flag each time the data strobe signal H_DQS is toggled according to the second embodiment. In addition, the sampler 126a inputs the taken valid flag to the pipeline constituted by the D flip-flops FF21v to FF24v at the timing based on the internal clock signal I_CLKa. The retimer 127a generates the data strobe signal N_DQS based on the valid flag passing through the D flip-flops FF21v to FF24v.

Therefore, the transceiver 112a can generate the data strobe signals N_DQS toggled as many as the number of toggles of the received data strobe signal H_DQS.

Note that the frequency of the internal clock signal I_CLKa is higher than the frequency of the data strobe signal H_DQS according to the second embodiment.

Therefore, it is possible to prevent the overflow of the data signal H_DQ[7:0] in the FIFO memory.

Note that the frequency of the internal clock signal I_CLKa needs to be lower than an operating frequency of the memory chip CP. This is because it is difficult for the memory chip CP to correctly receive the signal if the frequency of the internal clock signal I_CLKa is higher than the operating frequency of the memory chip CP.

Third Embodiment

The frequency of the internal clock signal I_CLKa needs to be slightly higher than the frequencies of the data signal H_DQ[7:0] and the data strobe signal H_DQS in the second embodiment. However, when a CR oscillator circuit is applied as the oscillator circuit 125a, a transmission frequency is likely to fluctuate depending on a drive voltage or an ambient temperature. There is a case where the fluctuation in the transmission frequency prevents the transmission frequency of the oscillator circuit 125a from satisfying the above conditions. In such a case, it is difficult for the transceiver 112a to perform the intended operation.

In a third embodiment, a transceiver can correct a fluctuation of a frequency when a transmission frequency of an oscillator circuit fluctuates from a desired frequency. The third embodiment will be described hereinafter. A semiconductor storage device according to the third embodiment is referred to as a semiconductor storage device 1b. Note that the third embodiment can be applied to any of the first embodiment, each modification of the first embodiment, and the second embodiment.

Figure 11:
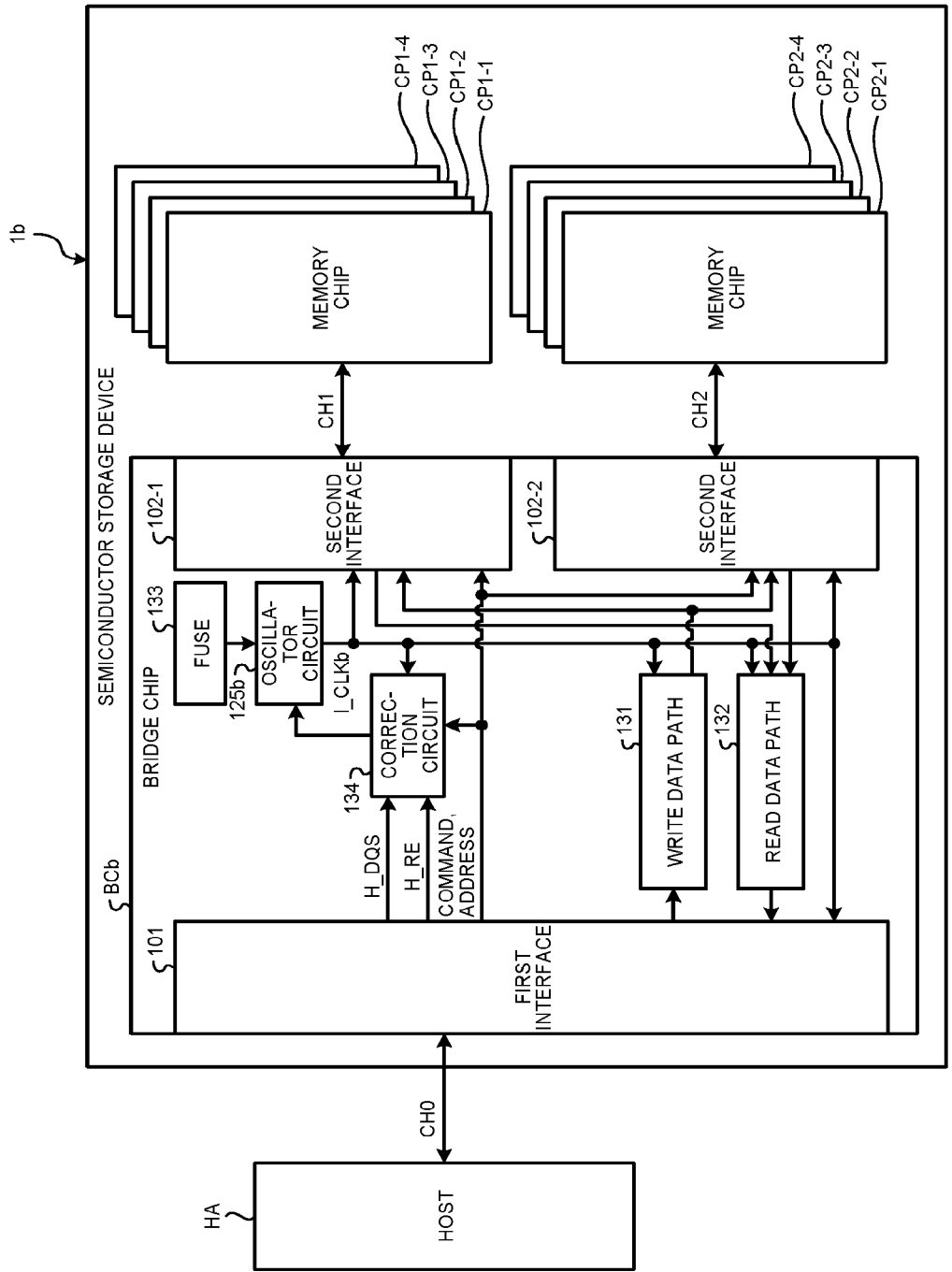
FIG. 11 is a schematic diagram for describing a configuration of a semiconductor storage device according to a third embodiment.

FIG. 11 is a schematic diagram for describing a configuration of the semiconductor storage device 1b according to the third embodiment. Hereinafter, the same configurations as those of the first embodiment are denoted by the same reference signs as those of the first embodiment. Further, the same configurations as those of the first embodiment will not be described or will be briefly described.

The storage system SYS includes the host HA and the semiconductor storage device 1b. The semiconductor storage device 1b includes a bridge chip BCb and the plurality of memory chips CP1-1 to CP1-4 and CP2-1 to CP2-4. The four memory chips CP1-1 to CP1-4 are connected to the bridge chip BCb via the channel CH1 and the four memory chips CP2-1 to CP2-4 are connected to the bridge chip BCb via the channel CH2. Configurations of the channels CH0, CH1, and CH2 are the same as those in the first embodiment.

The bridge chip BCb includes the first interface 101, the two second interfaces 102, and a transceiver 112b. Note that details of the buffer memory 104, the controller 103, and the controller 103 are not illustrated.

The transceiver 112b includes a write data path 131, a read data path 132, an oscillator circuit 125b, a fuse 133, and a correction circuit 134.

The oscillator circuit 125b is an oscillator circuit capable of controlling an oscillation frequency. The oscillator circuit 125b may be configured using, for example, a CR oscillator circuit. Note that the type of oscillator circuit 125b is not limited to the CR oscillator circuit. Any kind of oscillator circuit can be adopted as the oscillator circuit 125b as long as the oscillation frequency can be controlled.

The fuse 133 stores correction information of the oscillation frequency of the oscillator circuit 125b. The oscillation frequency of the oscillator circuit 125b sometimes deviates from a desired frequency due to manufacturing variations. The correction information is the amount of correction for causing the oscillation frequency to match with a desired frequency. The oscillator circuit 125b refers to the correction information stored in the fuse 133 at the start of energization of the bridge chip BCb, and oscillates a clock signal having a frequency whose deviation has been corrected based on the correction information. That is, in the initial state, the oscillator circuit 125b oscillates the clock signal having the frequency corrected by the correction information.

Note that the clock signal oscillated by the oscillator circuit 125b is referred to as an internal clock signal I_CLKb. The internal clock signal I_CLKb is input to the first interface 101, the second interfaces 102-1 and 102-2, the write data path 131, the read data path 132, and the correction circuit 134.

Write data received by the first interface 101 from the host HA via the channel CH0 is transmitted to the second interface 102-1 or the second interface 102-2 via the write data path 131. The second interface 102-1 or the second interface 102-2 having received the write data transmits the received write data to a destination memory chip CP via the channel CH1 or the channel CH2.

Note that the write data path 131 has the same configuration as the data path 120 according to the first embodiment or the data path 120a according to the second embodiment.

Read data received by the second interface 102-1 or the second interface 102-2 from a certain memory chip CP via the channel CH1 or the channel CH2 is transmitted to the first interface 101 via the read data path 132. The first interface 101 having received the read data transmits the received read data to the host HA via the channel CH0.

A command and an address received by the first interface 101 from the host HA via the channel CH0 are transmitted to the second interface 102-1 or the second interface 102-2. The second interface 102-1 or the second interface 102-2 having received the command and address transmits the received command and address to a destination memory chip CP via the channel CH1 or the channel CH2.

The data strobe signal DQS/DQSn and the read enable signal RE/REn received by the first interface 101 from the host HA via the channel CH0 are input to the correction circuit 134.

The correction circuit 134 can detect a fluctuation of the internal clock signal I_CLKb by comparing the data strobe signal DQS/DQSn or the read enable signal RE/REn with the internal clock signal I_CLKb. When detecting the fluctuation of the internal clock signal I_CLKb, the correction circuit 134 controls the oscillator circuit 125b so as to correct the fluctuation.

Figure 12:
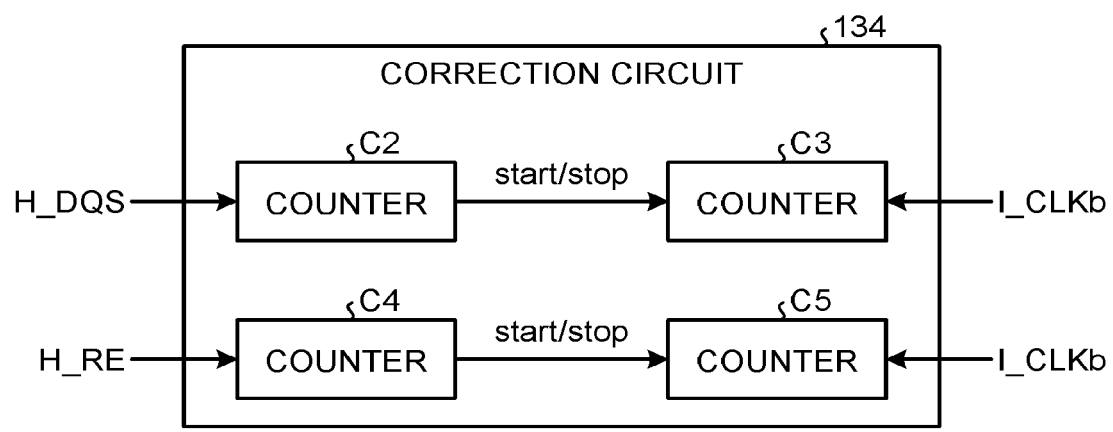
FIG. 12 is a schematic diagram illustrating an example of a more detailed configuration of a correction circuit according to the third embodiment.

FIG. 12 is a schematic diagram illustrating an example of a more detailed configuration of the correction circuit 134 according to the third embodiment. The correction circuit 134 includes four counters C2 to C5.

The counter C2 counts the number of toggles of the data strobe signal H_DQS. The counter C3 counts the number of toggles of the internal clock signal I_CLKb.

The counter C2 causes the counter C3 to start counting at the time of starting the counting of the number of toggles of the data strobe signal H_DQS. The counter C2 causes the counter C3 to stop counting when a count value of the number of toggles of the data strobe signal H_DQS reaches a predetermined value.

The correction circuit 134 corrects a set frequency of the oscillation frequency of the oscillator circuit 125b based on a count value of the counter C3 after the stop.

The counter C4 counts the number of toggles of the read enable signal H_RE. The counter C5 counts the number of toggles of the internal clock signal I_CLKb.

The counter C4 causes the counter C5 to start counting at the time of starting the counting of the number of toggles of the read enable signal H_RE. The counter C4 causes the counter C5 to stop counting when a count value of the number of toggles of the read enable signal H_RE reaches a predetermined value.

The correction circuit 134 corrects a set frequency of the oscillation frequency of the oscillator circuit 125b based on a count value of the counter C5 after the stop.

For example, it is possible to consider a case where the third embodiment is applied together with the second embodiment and the counters C3 and C5 stop counting when count values of the counters C2 and C4 reach "1024". According to the second embodiment, the internal clock signal I_CLKb needs to have a slightly higher frequency than the data strobe signal H_DQS (and the read enable signal RE). Therefore, a value larger than "1024" (for example, "1026") is set as a target lower limit value. Further, if the count values when the counters C3 and C5 are stopped are smaller than the target lower limit value, the correction circuit 134 increases the oscillation frequency of the oscillator circuit 125b.

Note that the amount of correction of the oscillation frequency in one-time correction can be arbitrarily configured. The correction circuit 134 may correct the oscillation frequency by the amount of the magnitude corresponding to the amount of deviation from a target value (for example, the target lower limit value). Alternatively, the correction circuit 134 may correct the oscillation frequency by a predetermined amount (for example, a minimum step width).

Figure 13:
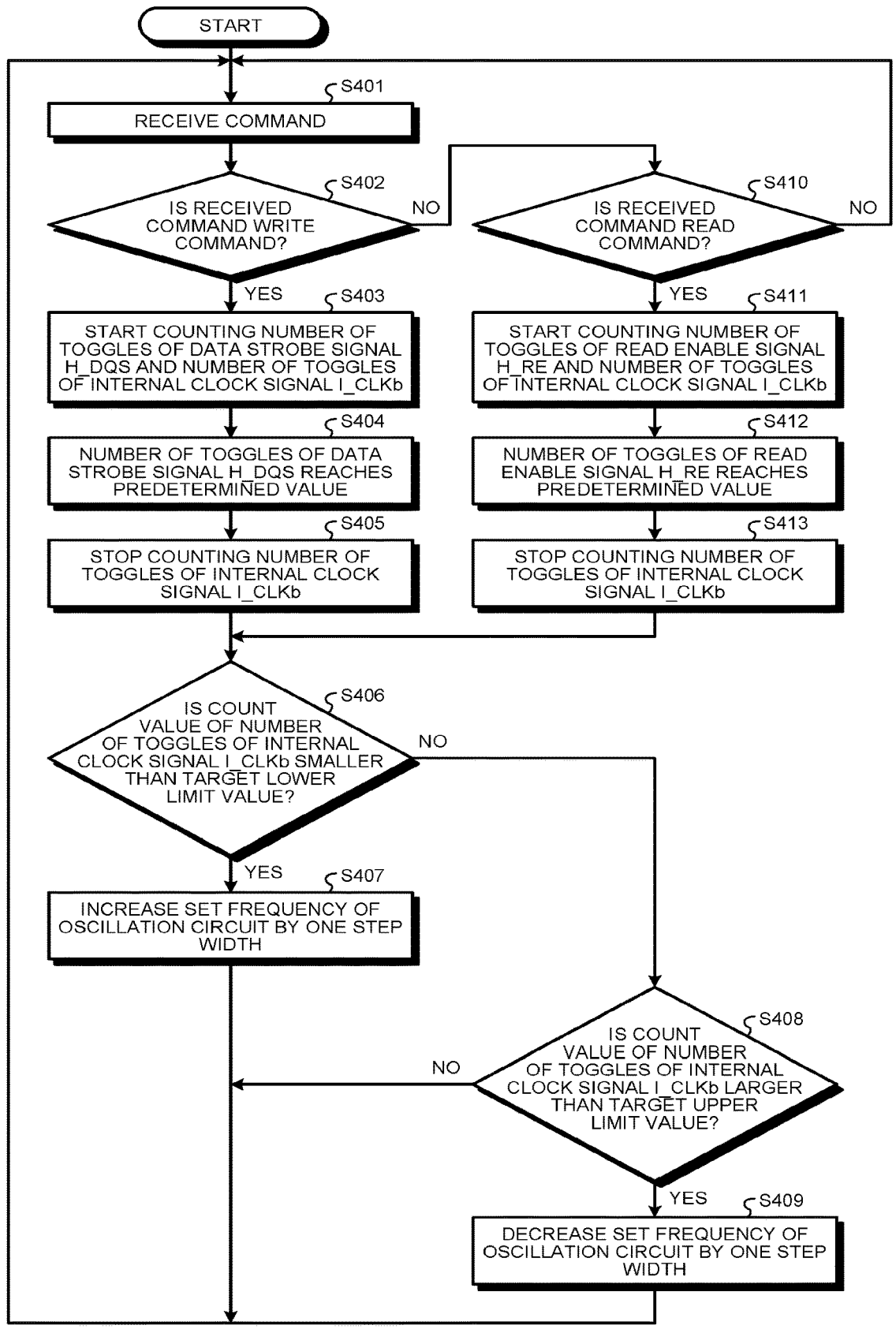
FIG. 13 is a flowchart illustrating an example of an operation of the correction circuit according to the third embodiment.

FIG. 13 is a flowchart illustrating an example of an operation of the correction circuit 134 according to the third embodiment. Here, as an example, it is assumed that a target upper limit value and a target lower limit value are set, and the correction circuit 134 corrects an oscillation frequency such that the count values when the counters C3 and C5 are stopped fall within a range between the target upper limit value and the target lower limit value. In addition, the correction amount of the oscillation frequency in one-time correction is set to the minimum step width.

First, when the bridge chip BCb receives a command from the host HA (S401), the correction circuit 134 determines whether the command is a write command (S402). When the command is a write command (S402: Yes), the correction circuit 134 starts counting the number of toggles of the data strobe signal H_DQS using the counter C2, and also starts counting the number of toggles of the internal clock signal I_CLKb using the counter C3 (S403).

When a count value of the number of toggles of the data strobe signal H_DQS reaches a predetermined value (S404), the counter C2 stops the counting the number of toggles of the internal clock signal I_CLKb performed by the counter C3 (S405).

Further, the correction circuit 134 determines whether the count value of the number of toggles of the internal clock signal I_CLKb obtained by the counter C3 is smaller than the target lower limit value (S406). When the count value of the number of toggles of the internal clock signal I_CLKb obtained by the counter C3 is smaller than the target lower limit value (S406: Yes), the correction circuit 134 increases the set frequency of the oscillator circuit 125b by one step width (S407).

When the count value of the number of toggles of the internal clock signal I_CLKb obtained by the counter C3 is not smaller than the target lower limit value (S406: No), the correction circuit 134 determines whether the count value of the number of toggles of the internal clock signal I_CLKb obtained by the counter C3 is larger than the target upper limit value (S408). When the count value of the number of toggles of the internal clock signal I_CLKb obtained by the counter C3 is larger than the target upper limit value (S408: Yes), the correction circuit 134 decreases the set frequency of the oscillator circuit 125b by one step width (S409).

The control transitions to S401 after S407, after S409, or when the count value of the number of toggles of the internal clock signal I_CLKb obtained by the counter C3 is not larger than the target upper limit value (S408: No).

If the command received from the host HA is not the write command (S402: No), the correction circuit 134 determines whether the command is a read command (S410). When the command is the read command (S410: Yes), the correction circuit 134 starts counting the number of toggles of the read enable signal H_RE using the counter C4, and also starts counting the number of toggles of the internal clock signal I_CLKb using the counter C5 (S411).

When the count value of the number of toggles of the read enable signal H_RE reaches a predetermined value (S412), the counter C4 stops counting the number of toggles of the internal clock signal I_CLKb performed by the counter C5 (S413). Further, the control transitions to S406.

When the command received from the host HA is not the read command (S410: No), the control transitions to S401.

In this manner, the correction circuit 134 corrects the transmission frequency of the oscillator circuit 125b based on the comparison between the data strobe signal H_DQS and the internal clock signal I_CLKb according to the third embodiment.

Therefore, it is possible to use the internal clock signal with high accuracy even when the oscillator circuit, such as a CR oscillator circuit, whose oscillation frequency is likely to fluctuate depending on the voltage or temperature is applied as the oscillator circuit 125b.

For example, when the third embodiment is applied together with the second embodiment, it is possible to keep the frequency of the internal clock signal I_CLKb higher than the frequency of the data strobe signal H_DQS. Therefore, it is possible to prevent malfunction of the transceiver 112b.

In addition, a designer can arbitrarily set the target upper limit value and the target lower limit value, for example, when the third embodiment is applied together with the first embodiment.

Alternatively, the correction circuit 134 may store a count value of the number of toggles of the internal clock signal I_CLKb obtained by the counter C3 or the counter C5 when the processing of S405 or S413 is executed for the first time after startup, and set the target upper limit value and the target lower limit value based on the stored count value. For example, the correction circuit 134 may set a value obtained by adding a predetermined second value to the stored count value as the target upper limit value, and set a value obtained by subtracting a predetermined third value from the stored count value as the target lower limit value. As a result, the oscillator circuit 125b can maintain the oscillation frequency in the initial state even if the voltage or temperature fluctuates.

As described above, the samplers 126 and 126a take the data signal H_DQ[7:0] at the timing based on the data strobe signal H_DQS according to the first to third embodiments and the modifications. The pipeline constituted by the D flip-flops FF0e to FF4e and FF0o to FF4o transfers the data signal H_DQ[7:0] taken by the sampler 126 using at least the internal clock signal I_CLK, I_CLKa, or I_CLKb as the drive signal. The retimer 127 acquires and transmits the data signal H_DQ[7:0] that has passed through the pipeline.

Since the transceiver 112, 112a, or 112b has the pipeline, the high-speed data transfer is possible. Further, the transceiver 112, 112a, or 112b uses at least the internal clock signal I_CLK, I_CLKa, or I_CLKb as the drive signal, and thus, can transmit the received data signal without leaving any residue.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A transceiver comprising:
a sampler that takes a data signal received from a host at a timing based on a data strobe signal received from the host;
a pipeline that transfers the data signal taken by the sampler using a drive signal, the pipeline using, during a first period, the data strobe signal as the drive signal, and using, during a second period different from the first period, a clock signal, different from the data strobe signal, as the drive signal; and
a transmission circuit that acquires and transmits the data signal having passed through the pipeline.

2. The transceiver according to claim 1, wherein
the first period is a period when the data strobe signal is input, and
the transceiver further comprises:
a supply circuit that supplies the data strobe signal to the pipeline as the drive signal during the first period, and supplies the clock signal to the pipeline as the drive signal during the second period after the first period.

3. The transceiver according to claim 2, wherein
the supply circuit determines the end of the input of the data strobe signal based on a count of a number of times the data strobe signal is toggled.

4. The transceiver according to claim 2, wherein
the supply circuit determines the end of the input of the data strobe signal based on sampling of the data strobe signal.

5. The transceiver according to claim 1, wherein
the sampler includes a first-in first-out (FIFO) memory, stores the data signal taken at a timing based on the data strobe signal into the FIFO memory, and inputs the data signal stored in the FIFO memory to the pipeline at a timing based on the clock signal, and
the pipeline transfers the data signal using the clock signal.

6. The transceiver according to claim 5, wherein
a frequency of the clock signal is higher than a frequency of the data strobe signal.

7. The transceiver according to claim 6, further comprising
an oscillator circuit that oscillates the clock signal.

8. The transceiver according to claim 7, further comprising
a correction circuit that corrects a frequency of the clock signal based on a comparison between the data strobe signal and the clock signal.

9. The transceiver according to claim 1, further comprising
an oscillator circuit that oscillates the clock signal.

10. The transceiver according to claim 9, further comprising
a correction circuit that corrects a frequency of the clock signal based on a comparison between the data strobe signal and the clock signal.

11. A bridge chip which is electrically connected to a host and a memory chip and executes data transfer between the host and the memory chip, the bridge chip comprising:
a first interface that receives a data signal and a data strobe signal from the host;
a sampler that takes the data signal at a timing based on the data strobe signal;
a pipeline that transfers the data signal taken by the sampler using a drive signal, the pipeline using, during a first period, the data strobe signal as the drive signal, and using, during a second period different from the first period, a clock signal, different from the data strobe signal, as the drive signal;
a transmission circuit that acquires and transmits the data signal having passed through the pipeline; and
a second interface that transmits the data signal transmitted by the transmission circuit to the memory chip.

12. A semiconductor storage device comprising:
a bridge chip that is electrically connectable to a host and is capable of receiving a signal from the host; and
a memory chip electrically connected to the bridge chip, wherein
the bridge chip includes:
a sampler that takes a data signal received from the host at a timing based on a data strobe signal received from the host;
a pipeline that transfers the data signal taken by the sampler using a drive signal, the pipeline using during a first period, the data strobe signal as the drive signal, and using, during a second period different from the first period, a clock signal, different from the data strobe signal, as the drive signal; and
a transmission circuit that acquires and transmits the data signal having passed through the pipeline.

13. The semiconductor storage device according to claim 12, wherein
the first period is a period when the data strobe signal is input, and
the semiconductor storage device further comprises:
a supply circuit that supplies the data strobe signal to the pipeline as the drive signal during the first period, and supplies the clock signal to the pipeline as the drive signal during the second period after the first period.

14. The semiconductor storage device according to claim 12, wherein
the sampler includes a first-in first-out (FIFO) memory, stores the data signal taken at a timing based on the data strobe signal in the FIFO memory, and inputs the data signal stored in the FIFO memory to the pipeline at a timing based on the clock signal, and
the pipeline transfers the data signal using the clock signal.

15. The semiconductor storage device according to claim 14, wherein
a frequency of the clock signal is higher than a frequency of the data strobe signal.

16. The semiconductor storage device according to claim 15, further comprising
an oscillator circuit that oscillates the clock signal.

17. The semiconductor storage device according to claim 16, further comprising
a correction circuit that corrects a frequency of the clock signal based on a comparison between the data strobe signal and the clock signal.

18. The semiconductor storage device according to claim 12, further comprising
an oscillator circuit that oscillates the clock signal.

19. The semiconductor storage device according to claim 18, further comprising
a correction circuit that corrects a frequency of the clock signal based on a comparison between the data strobe signal and the clock signal.

20. A method comprising:
taking a data signal received from a host at a timing based on a data strobe signal received from the host;
transferring the taken data signal via a pipeline using during a first period, the data strobe signal as a drive signal, and using, during a second period different from the first period, a clock signal, different from the data strobe signal, as the drive signal; and
acquiring and transmitting the data signal that has passed through the pipeline.

* * * * *